(12) United States Patent
Fukunaga et al.

(10) Patent No.: US 11,677,287 B2
(45) Date of Patent: Jun. 13, 2023

(54) STATOR, ELECTRIC ROTATING MACHINE, AND ELECTRIC-POWERED VEHICLE

(71) Applicant: SUBARU CORPORATION, Tokyo (JP)

(72) Inventors: Kenichi Fukunaga, Tokyo (JP); Kimihiro Nagase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 289 days.

(21) Appl. No.: 16/952,969

(22) Filed: Nov. 19, 2020

(65) Prior Publication Data

US 2021/0218306 A1    Jul. 15, 2021

(30) Foreign Application Priority Data

Jan. 15, 2020 (JP) .............................. JP2020-004063

(51) Int. Cl.
| | |
|---|---|
| *H02K 3/28* | (2006.01) |
| *B60K 1/00* | (2006.01) |
| *H02K 21/14* | (2006.01) |
| *H02K 1/16* | (2006.01) |
| *H02K 3/12* | (2006.01) |

(52) U.S. Cl.
CPC ............. *H02K 3/28* (2013.01); *B60K 1/00* (2013.01); *H02K 1/16* (2013.01); *H02K 3/12* (2013.01); *H02K 21/14* (2013.01)

(58) Field of Classification Search
CPC ........ H02K 1/16; H02K 3/00; H02K 3/04–14; H02K 3/46; H02K 3/48; H02K 3/50–505; H02K 3/28
See application file for complete search history.

(56) References Cited

U.S. PATENT DOCUMENTS

| | | | |
|---|---|---|---|
| 6,201,332 B1 | 3/2001 | Umeda et al. | |
| 6,979,926 B2 * | 12/2005 | Ogawa | H02K 3/12 |
| | | | 310/201 |
| 2012/0032544 A1 * | 2/2012 | Kasuya | H02K 11/225 |
| | | | 310/90 |
| 2012/0146447 A1 * | 6/2012 | Seguchi | H02K 3/50 |
| | | | 310/198 |

FOREIGN PATENT DOCUMENTS

| | | |
|---|---|---|
| JP | 2000-092766 A | 3/2000 |
| JP | 2009-095193 A | 4/2009 |
| JP | 2013-081351 A | 5/2013 |

* cited by examiner

*Primary Examiner* — Ahmed Elnakib
*Assistant Examiner* — Minki Chang
(74) *Attorney, Agent, or Firm* — McGinn I.P. Law Group, PLLC.

(57) ABSTRACT

A stator includes a stator core and a stator winding. The stator core has a cylindrical shape and a plurality of slots. The stator winding includes a plurality of phase windings each including a plurality of segment conductors inserted into the slots and coupled to each other in series. Each of the segment conductors has a pair of straight parts and a bend. The pair of straight parts is accommodated in two of the plurality of slots. The bend protrudes from an end face of the stator core and couples the pair of straight parts to each other. In each of the plurality of slots, the number of the bends protruding from the end face of the stator core to extend in one of circumferential directions matches the number of the bends protruding from the end face of the stator core to extend in the other of the circumferential directions.

20 Claims, 23 Drawing Sheets

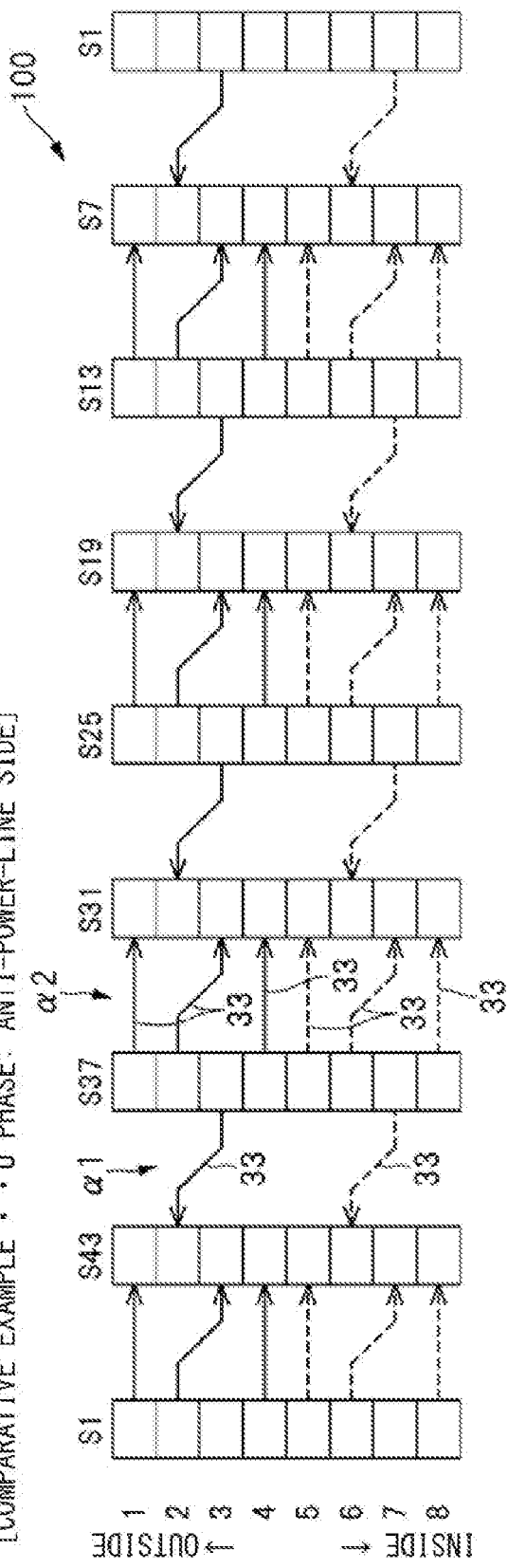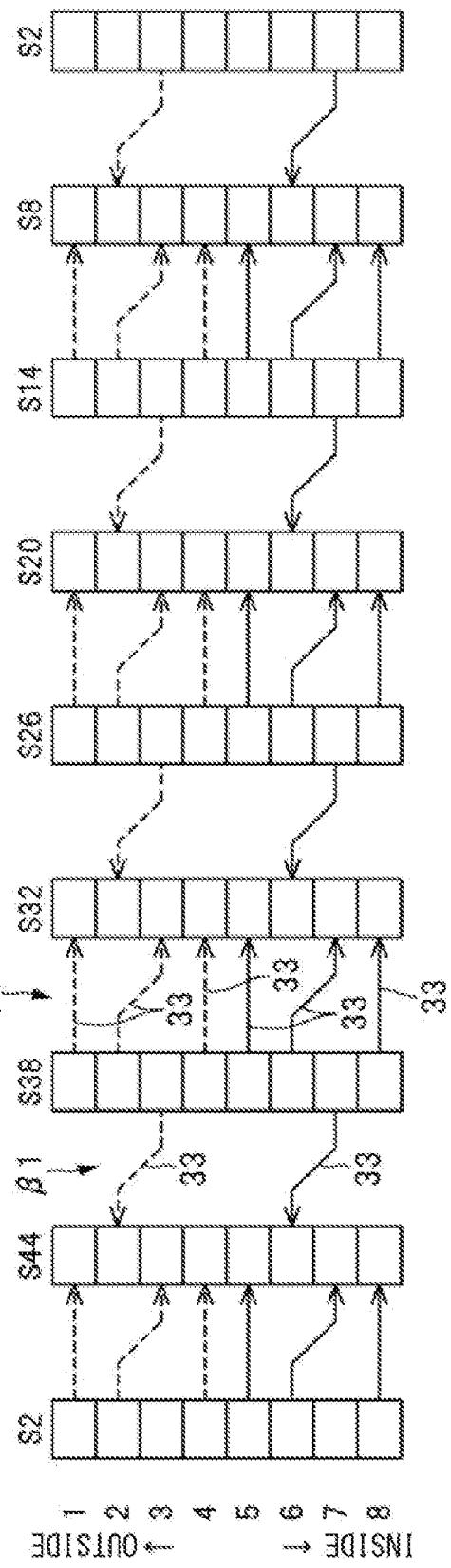
FIG. 22

STATOR, ELECTRIC ROTATING MACHINE, AND ELECTRIC-POWERED VEHICLE

CROSS-REFERENCE TO RELATED APPLICATIONS

The present application claims priority from Japanese Patent Application No. 2020-004063 filed on Jan. 15, 2020, the entire contents of which are hereby incorporated by reference.

BACKGROUND

The technology relates to a stator, an electric rotating machine, and an electric-powered vehicle.

An electric rotating machine, such as an electric motor or an electric generator, is provided with a stator that generates magnetic field. As a known way to achieve higher efficiency of the electric rotating machine, the stator uses a stator coil including a plurality of segment coils. Japanese Unexamined Patent Application Publication (JP-A) No. 2000-092766 discloses a stator that uses a stator coil including segment coils each bent into a substantially U shape. Reference may also be made to JP-A No. 2009-095193 and JP-A No. 2013-081351. In such a stator, the segment coils are inserted into slots of a stator core, and the segment coils are coupled to each other as one conductor.

SUMMARY

An aspect of the technology provides a stator to be provided in an electric rotating machine. The stator includes a stator core and a stator winding. The stator core has a cylindrical shape and a plurality of slots. The stator winding includes a plurality of phase windings each including a plurality of segment conductors inserted into the slots and coupled to each other in series. Each of the segment conductors has a pair of straight parts and a bend. The pair of straight parts is accommodated in two of the plurality of slots. The bend protrudes from an end face of the stator core and couples the pair of straight parts to each other. In each of the plurality of slots, the number of the bends protruding from the end face of the stator core to extend in one of circumferential directions matches the number of the bends protruding from the end face of the stator core to extend in the other of the circumferential directions.

An aspect of the technology provides a stator to be provided in an electric rotating machine. The stator includes a stator core and a stator winding. The stator core has a cylindrical shape and a plurality of slots. The stator winding includes a plurality of phase windings each including a plurality of segment conductors inserted into the slots and coupled to each other in series. The plurality of slots includes a first slot group including a plurality of first slots disposed to be evenly spaced, out of the plurality of slots, and a second slot group phase-shifted from the first slot group and including a plurality of second slots disposed to be evenly spaced, out of the plurality of slots. Each of the segment conductors has a pair of straight parts accommodated in two of the plurality of slots, and a bend protruding from an end face of the stator core and coupling the pair of straight parts to each other. Each of the phase windings includes a first series conductor group and a second series conductor group coupled to each other in parallel and each including the plurality of segment conductors coupled to each other in series. The first series conductor group includes a first conductor group and a second conductor group that include segment conductors equal in number to each other, out of the plurality of segment conductors. The second series conductor group includes a third conductor group and a fourth conductor group that include segment conductors equal in number to each other, out of the plurality of segment conductors. The segment conductors of the first series conductor group are classified into the first conductor group inserted into the first slot group and the second conductor group inserted into the second slot group. The segment conductors of the second series conductor group are classified into the third conductor group inserted into the first slot group and the fourth conductor group inserted into the second slot group.

An aspect of the technology provides an electric rotating machine including a stator and a rotor. The stator includes a stator core and a stator winding. The stator core has a cylindrical shape and a plurality of slots. The stator winding includes a plurality of phase windings each including a plurality of segment conductors inserted into the slots and coupled to each other in series. Each of the segment conductors has a pair of straight parts and a bend. The pair of straight parts is accommodated in two of the plurality of slots. The bend protrudes from an end face of the stator core and couples the pair of straight parts to each other. In each of the plurality of slots, the number of the bends protruding from the end face of the stator core to extend in one of circumferential directions matches the number of the bends protruding from the end face of the stator core to extend in the other of the circumferential directions. The rotor includes a plurality of permanent magnets arranged in the circumferential directions, and is provided on an inner circumference side of the stator to be relatively rotatable with respect to the stator.

An aspect of the technology provides an electric-powered vehicle including an electric rotating machine as a driving source. The electric rotating machine includes a stator and a rotor. The stator includes a stator core and a stator winding. The stator core has a cylindrical shape and a plurality of slots. The stator winding includes a plurality of phase windings each including a plurality of segment conductors inserted into the slots and coupled to each other in series. Each of the segment conductors has a pair of straight parts and a bend. The pair of straight parts is accommodated in two of the plurality of slots. The bend protrudes from an end face of the stator core and couples the pair of straight parts to each other. In each of the plurality of slots, the number of the bends protruding from the end face of the stator core to extend in one of circumferential directions matches the number of the bends protruding from the end face of the stator core to extend in the other of the circumferential directions. The rotor includes a plurality of permanent magnets arranged in the circumferential directions, and is provided on an inner circumference side of the stator to be relatively rotatable with respect to the stator.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 22 is a diagram illustrating positions of bends of segment coils included in a stator according to a comparative example.

DETAILED DESCRIPTION

Figure 1:
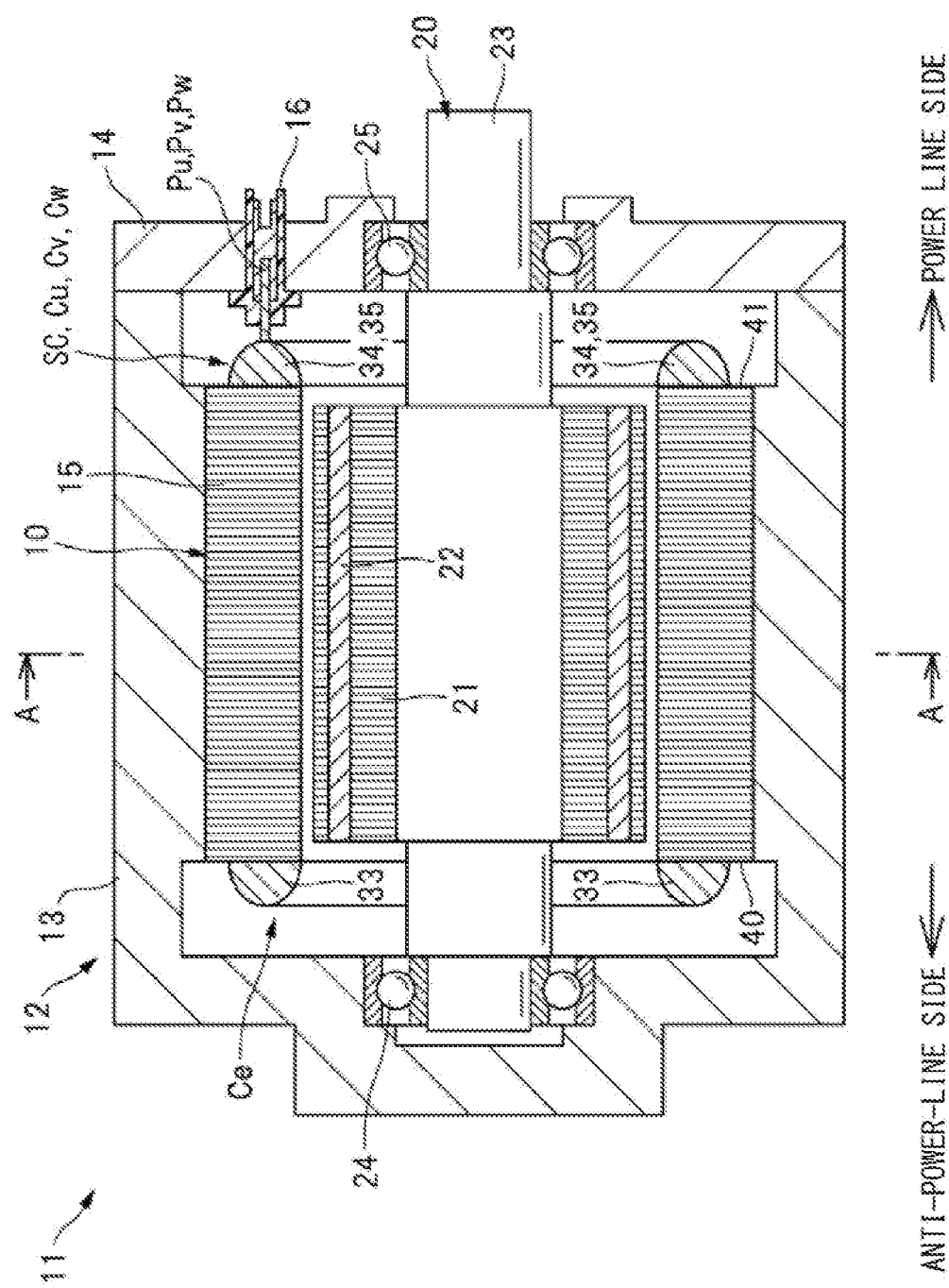
FIG. 1 is a cross-sectional view of an exemplary electric rotating machine including a stator according to one example embodiment of the technology.

In the following, some example embodiments of the technology are described with reference to the accompanying drawings. Note that the following description is directed to illustrative examples of the disclosure and not to be construed as limiting the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

The following description describes, as an example of an electric rotating machine 11 to be provided with a stator 10 according to an example embodiment of the technology, an electric rotating machine to be mounted on an electric-powered vehicle, such as an electric vehicle or a hybrid electric vehicle, as a driving source. In the example embodiment, the electric rotating machine may be a three-phase alternating-current synchronous motor generator. However, without being limited to this example, the electric rotating machine 11 may be any electric rotating machine, as long as the electric rotating machine includes a stator to which segment coils are attached. A drive shaft of the vehicle may be coupled to a rotor of the motor generator to be able to transmit output torque of the rotor. Drive wheels of the vehicle may receive the torque transmitted via the drive shaft to propel the vehicle.

[Structure of Electric Rotating Machine]

FIG. 1 is a cross-sectional view of the exemplary electric rotating machine 11 including the stator 10 according to an example embodiment of the technology. As illustrated in FIG. 1, the electric rotating machine 11 serving as a motor generator may include a motor housing 12. The motor housing 12 may include a housing body 13 and an end cover 14. The housing body 13 may have a bottomed cylindrical shape. The end cover 14 may close an open end of the housing body 13. The stator 10 fixed in the housing body 13 includes a cylindrical stator core 15 and a three-phase stator coil SC (hereinafter referred to as stator winding SC). The stator core 15 may include a plurality of silicon steel plates, for example. The stator winding SC may be attached to the stator core 15. The end cover 14 may be provided with a high-voltage connector 16 to be coupled to an inverter (not illustrated), for example. To the high-voltage connector 16 may be coupled power line terminals Pu, Pv, and Pw extending from the stator winding SC. In one embodiment, the stator core 15 may serve as a "stator core", and the stator coil or stator winding SC may serve as a "stator winding". In one embodiment, a segment coil 30 to be described later may serve as a "segment conductor".

In the middle of the stator core 15, a columnar rotor 20 is accommodated rotatably. The rotor 20 may include a cylindrical rotor core 21, a plurality of permanent magnets 22, and a rotor shaft 23. The rotor core 21 may include a plurality of silicon steel plates, for example. The permanent magnets 22 may be provided in the rotor core 21. The rotor shaft 23 may be fixed in the middle of the rotor core 21. One end of the rotor shaft 23 may be supported by a bearing 24, and the other end of the rotor shaft 23 may be supported by a bearing 25. The bearing 24 may be provided in the housing body 13. The bearing 25 may be provided in the end cover 14.

[Structure of Stator]

Figure 2:
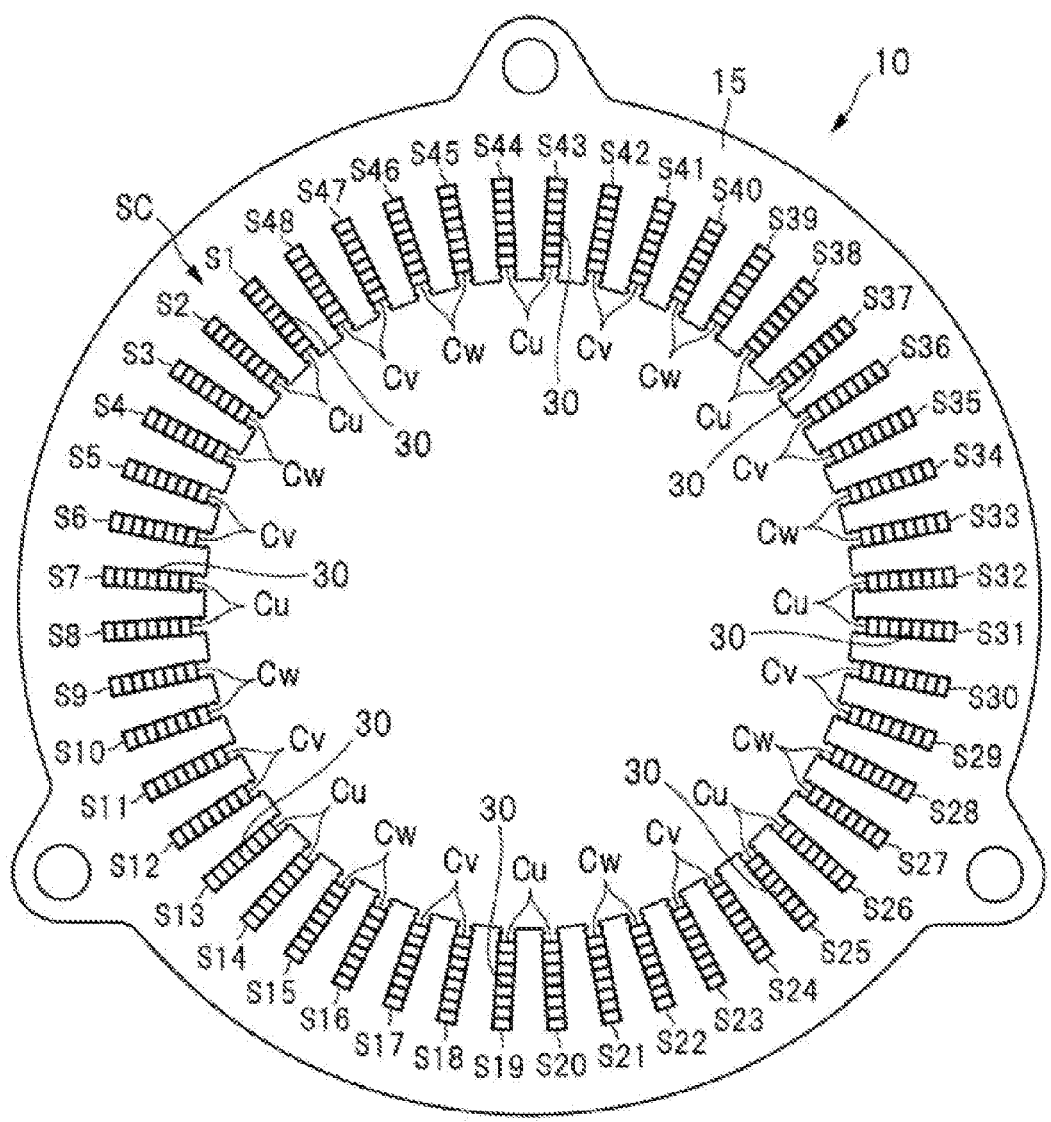
FIG. 2 is a cross-sectional view of the stator taken along line A-A in FIG. 1.
Figure 3:
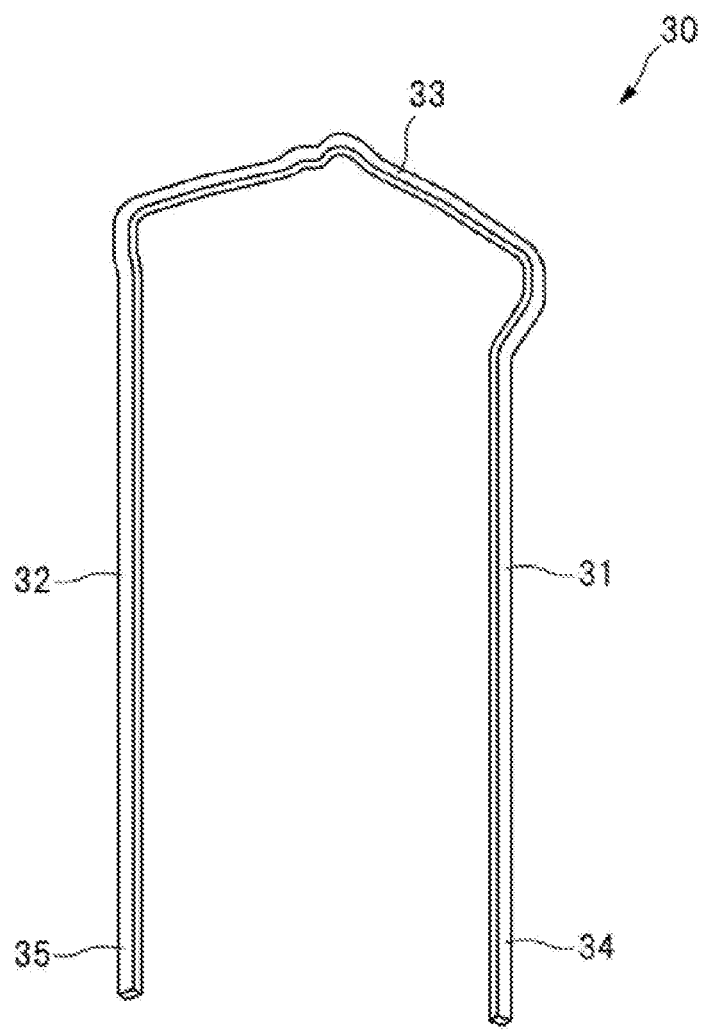
FIG. 3 is a perspective view of exemplary segment coils.
Figure 4:
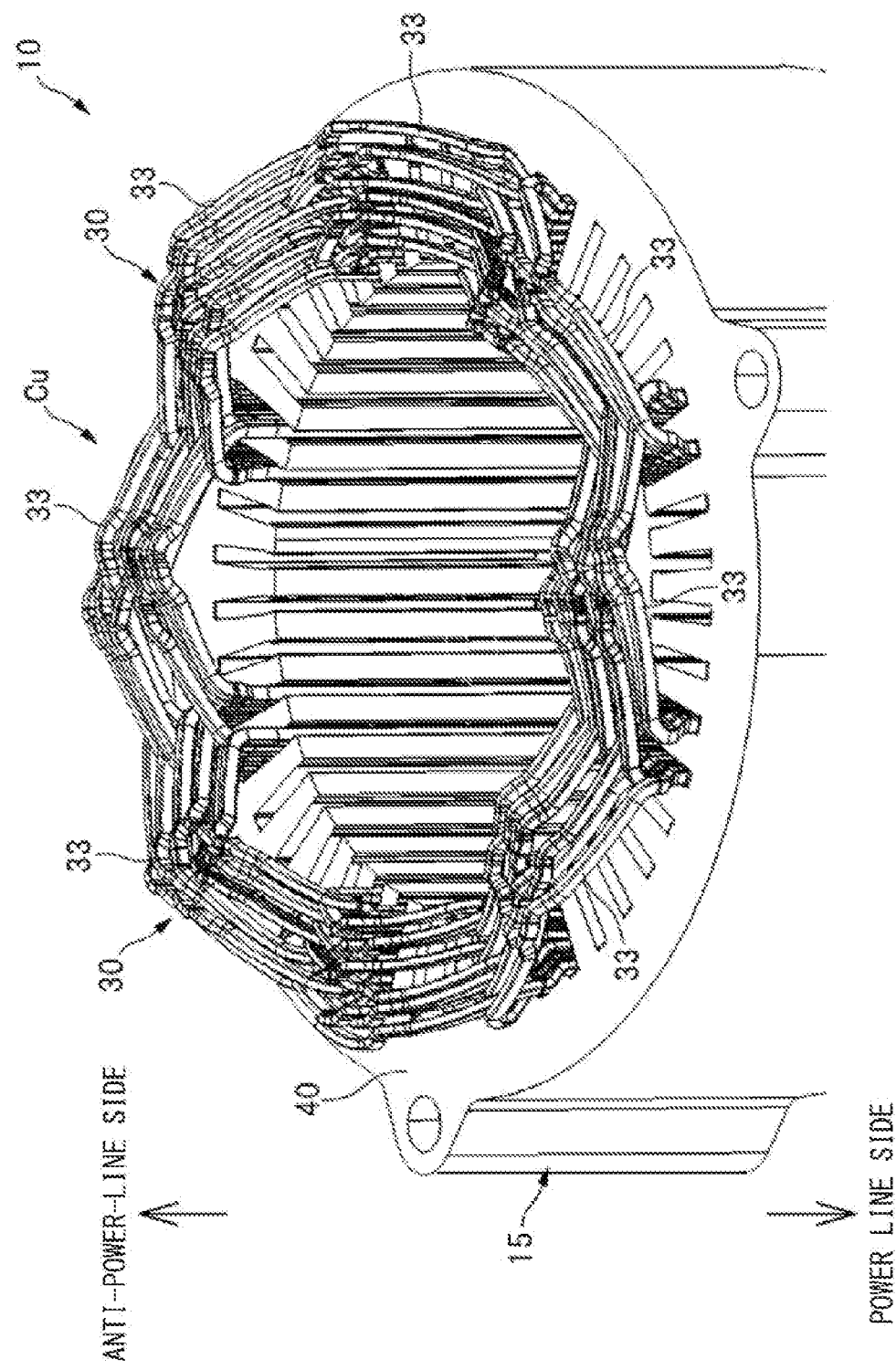
FIG. 4 is a perspective view of a part of a stator core provided with a U-phase coil.
Figure 5:
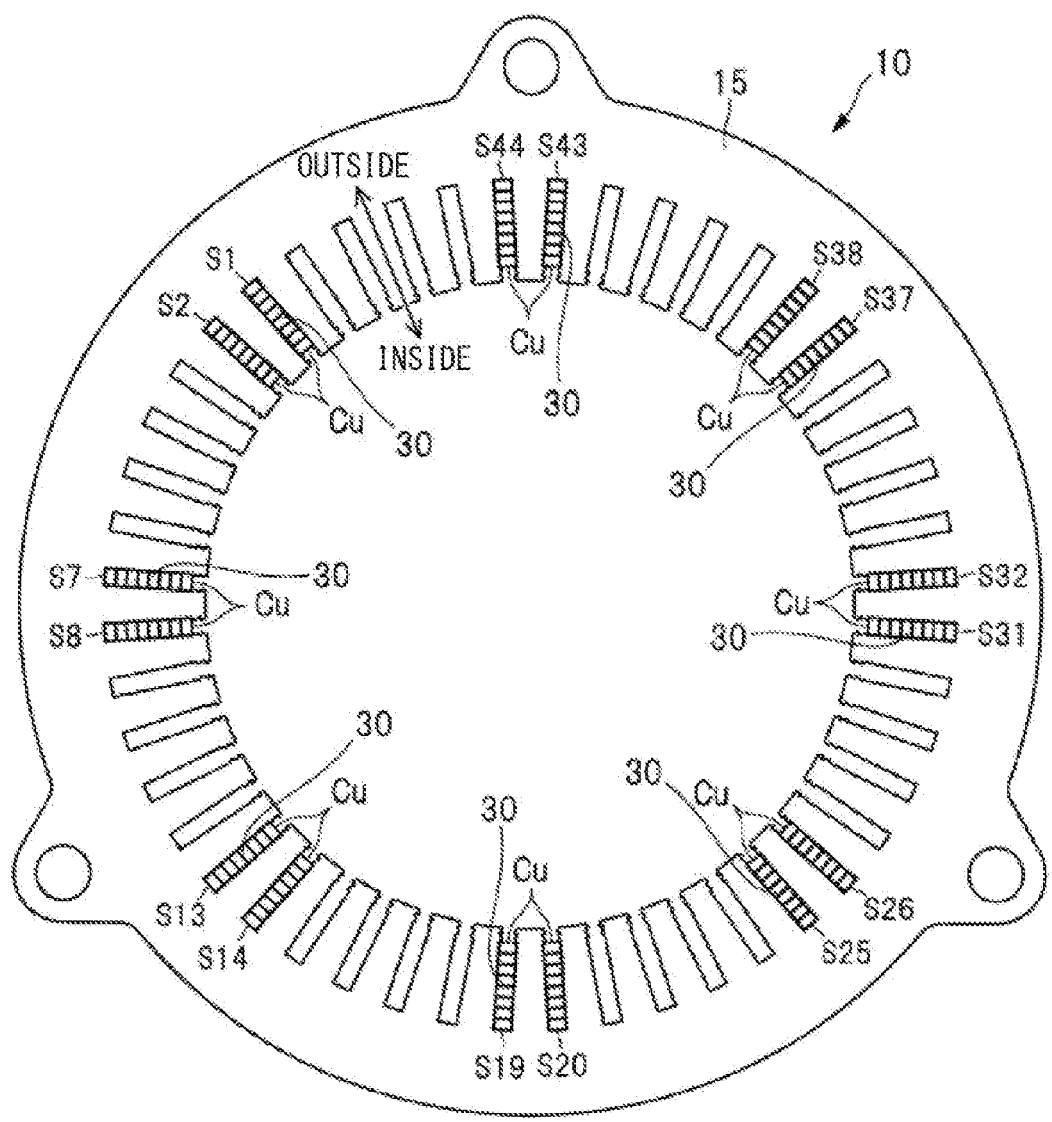
FIG. 5 is a cross-sectional view of the stator core provided with the U-phase coil.
Figure 6A:
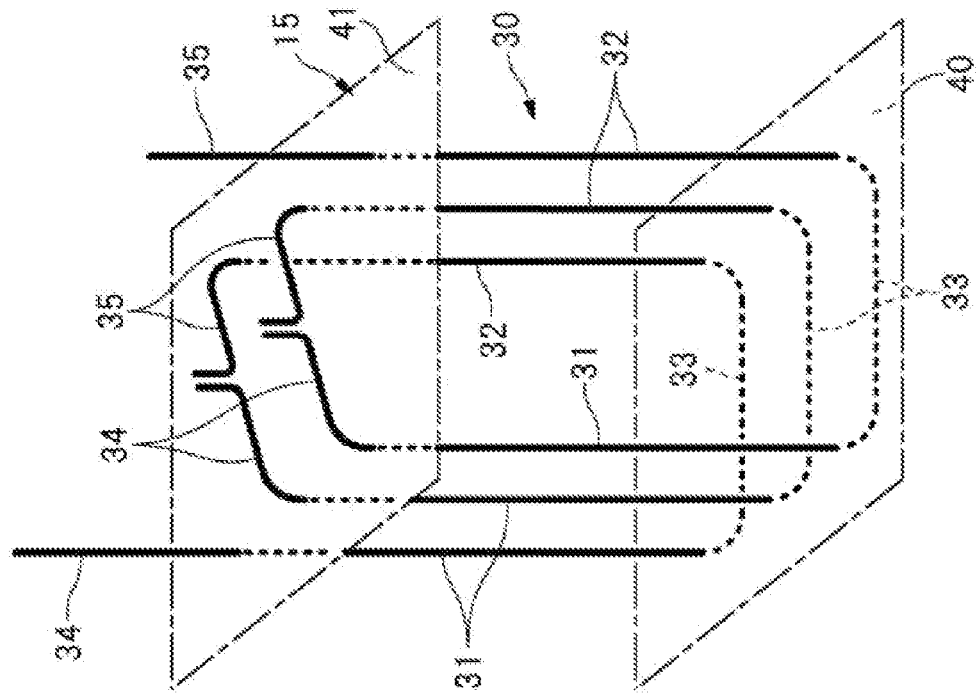
FIGS. 6A and 6B are diagrams illustrating an example of how segment coils are coupled.
Figure 6B:
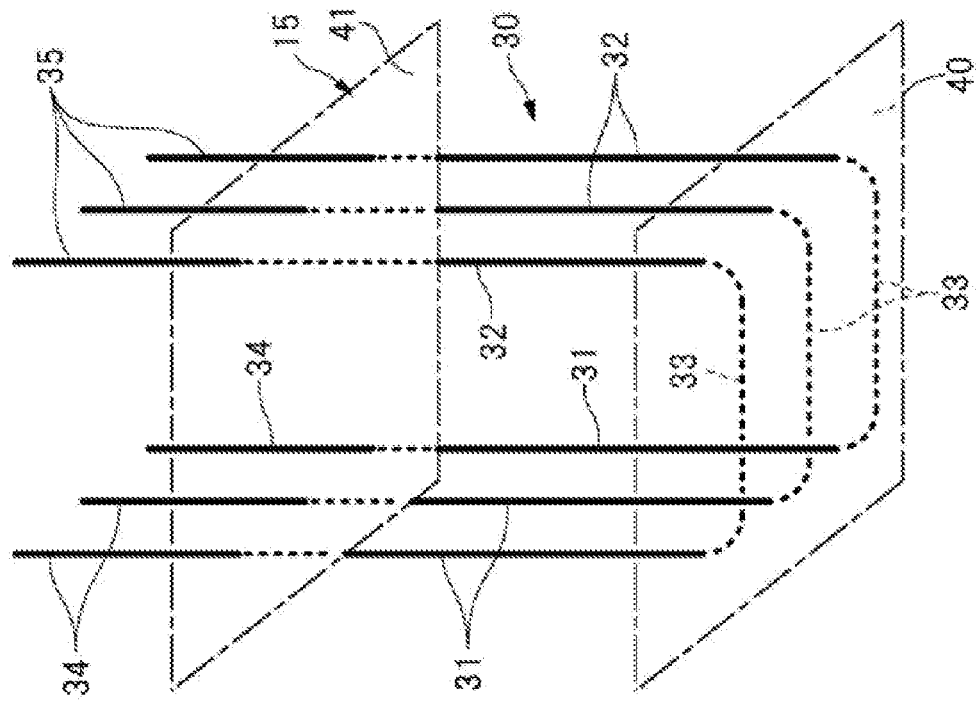

FIG. 2 is a cross-sectional view of the stator 10 taken along line A-A in FIG. 1. FIG. 3 is a perspective view of exemplary segment coils 30. FIG. 4 is a perspective view of a part of the stator core 15 provided with a U-phase phase winding (hereinafter referred to as U-phase coil Cu). FIG. 5 is a cross-sectional view of the stator core 15 provided with the U-phase coil Cu. FIGS. 6A and 6B illustrate an example of how the segment coils 30 are coupled. The U-phase coil Cu may refer to a phase winding configuring one phase of the three phases. As will be described later, the stator winding SC may include the U-phase coil Cu, a V-phase phase winding (hereinafter referred to as V-phase coil Cv), and a W-phase phase winding (hereinafter referred to as W-phase coil Cw).

As illustrated in FIG. 2, an inner circumference of the cylindrical stator core 15 may have a plurality of slots S1 to S48 provided at predetermined intervals in a circumferential direction. The slots S1 to S48 may accommodate the segment coils 30 to be described later, and the segment coils 30 may be coupled to each other to configure the stator winding SC. In the illustrated example, the slots S1, S2, S7, S8, etc. may accommodate the segment coils 30 included in the U-phase coil Cu, the slots S3, S4, S9, S10, etc. may accommodate the segment coils 30 included in the W-phase coil Cw, and the slots S5, S6, S11, S12, etc. may accommodate the segment coils 30 included in the V-phase coil Cv.

As illustrated in FIG. 3, the segment coil 30 bent into a substantially U shape has a coil side 31 to be accommodated in any slot (e.g., the slot S1) and a coil side 32 to be accommodated in another slot (e.g., the slot S7). The coil side 32 may be distanced from the coil side 31 by a predetermined coil pitch. The segment coil 30 may also have a bend 33 and welding ends 34 and 35. The bend 33 couples the pair of coil sides 31 and 32 to each other. The welding ends 34 and 35 may extend from the pair of coil sides 31 and 32. The segment coil 30 may include rectangular wire including an electrically-conductive material such as copper. The segment coil 30, excluding tips of the welding ends 34 and 35, may be provided with enamel or an insulating film such as a resin film. The bend 33 of the segment coil 30 may have, without being limited to the bend shape illustrated in FIG. 3, any of various bend shapes depending on a position where the segment coil 30 is attached to the stator core 15. In one embodiment, the coil sides 31 and 32 may serve as a "straight part" of the segment coil, and the bend 33 may serve as a "bend" of the segment coil.

As illustrated in FIG. 3 to FIG. 5, the segment coils 30 each having the pair of coil sides 31 and 32 may be attached to the stator core 15. The pair of coil sides 31 and 32 may be distanced from each other by the predetermined coil pitch (e.g., six slots). As illustrated in FIG. 4 and FIG. 6A, the bend 33 of the segment coil 30 protrudes from an end face 40 of the stator core 15, and the welding ends 34 and 35 of the segment coil 30 may protrude from an end face 41 of the stator core 15. The end face 40 may refer to one end face of the stator core 15, and the end face 41 may refer to the other end face of the stator core 15. As illustrated in FIG. 6B, the welding ends 34 and 35 protruding from the end face 41 of the stator core 15 may be bent to come into contact with the welding ends 34 and 35 of another segment coil 30. The welding ends 34 and 35 may thus be welded to the welding ends 34 and 35 of the other segment coil 30 in contact with the segment coil 30. In this manner, the segment coils 30 may be coupled to each other into one conductor, and the segment coils 30 configure the U-phase coil Cu. The welding ends 34 and 35 subjected to welding may be provided with a covering of insulation. Providing a covering of insulation may refer to providing a resin film, for example, to cover a conductor. In one embodiment, the end face 40 may serve as an "end face".

Figure 7:
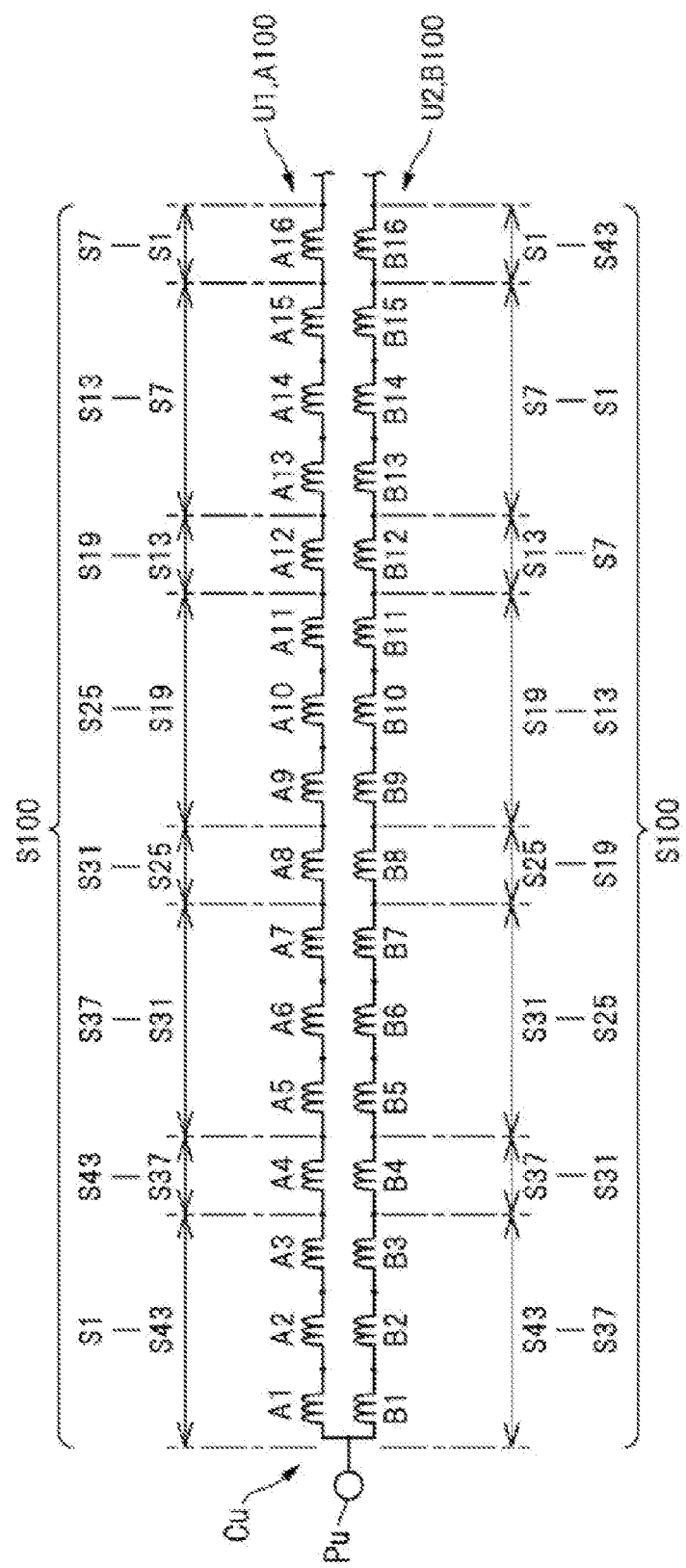
FIG. 7 is a diagram illustrating an example of a coil structure of the U-phase coil.
Figure 8:
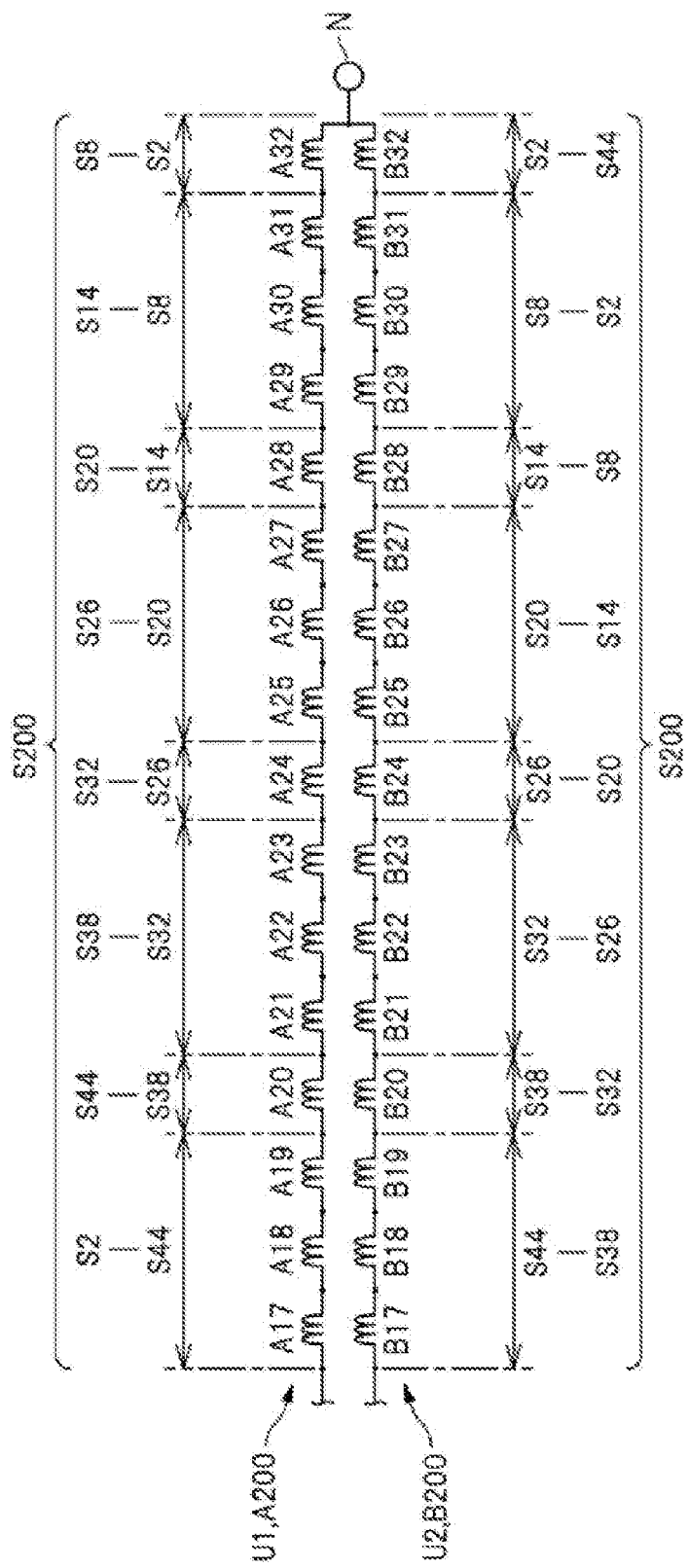
FIG. 8 is a diagram illustrating the example of the coil structure of the U-phase coil.
Figure 9B:
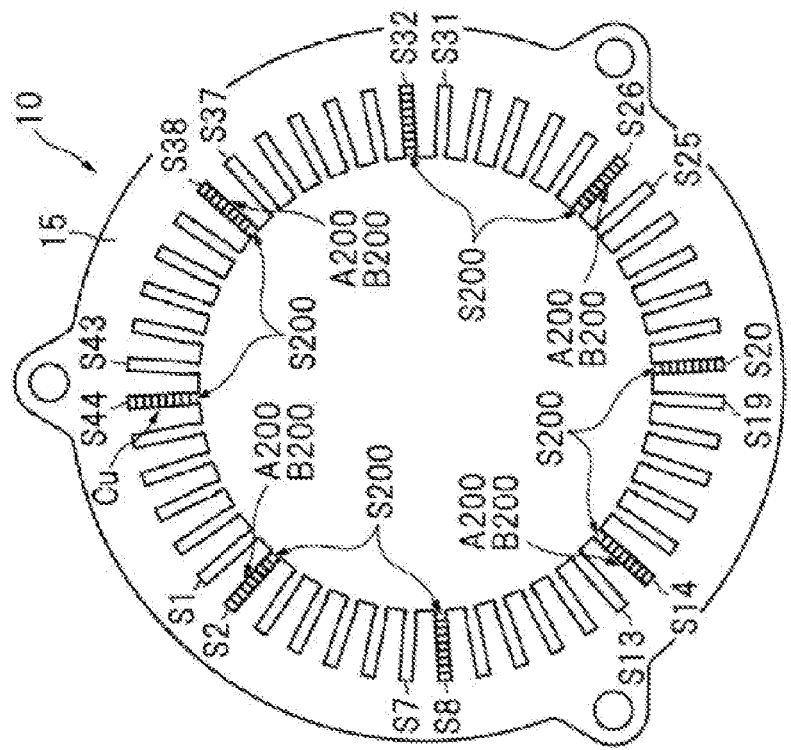
FIG. 9B is a diagram illustrating an example of a second slot group that accommodates a part of the U-phase coil.
Figure 9A:
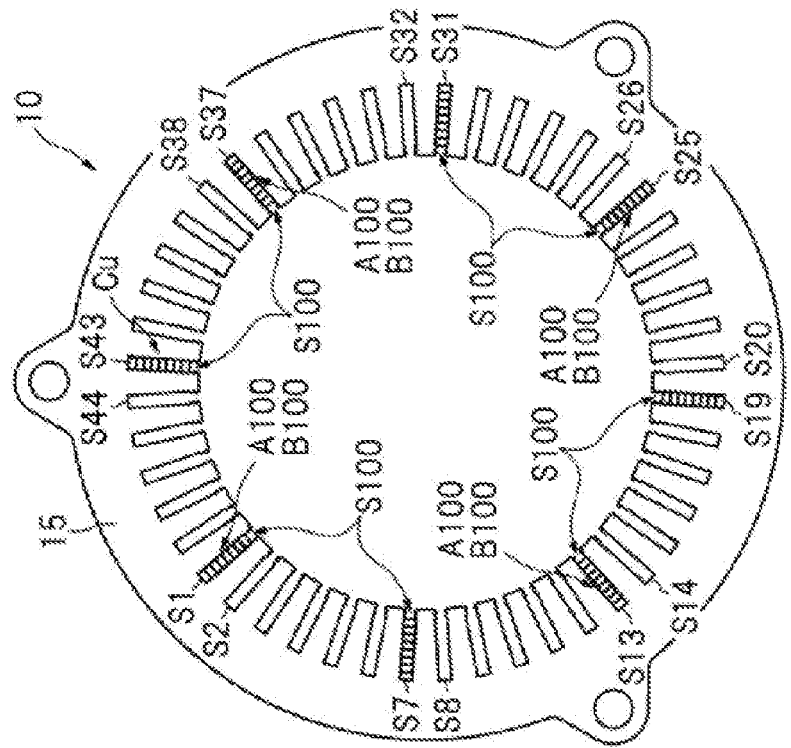
FIG. 9A is a diagram illustrating an example of a first slot group that accommodates a part of the U-phase coil.
Figure 10:
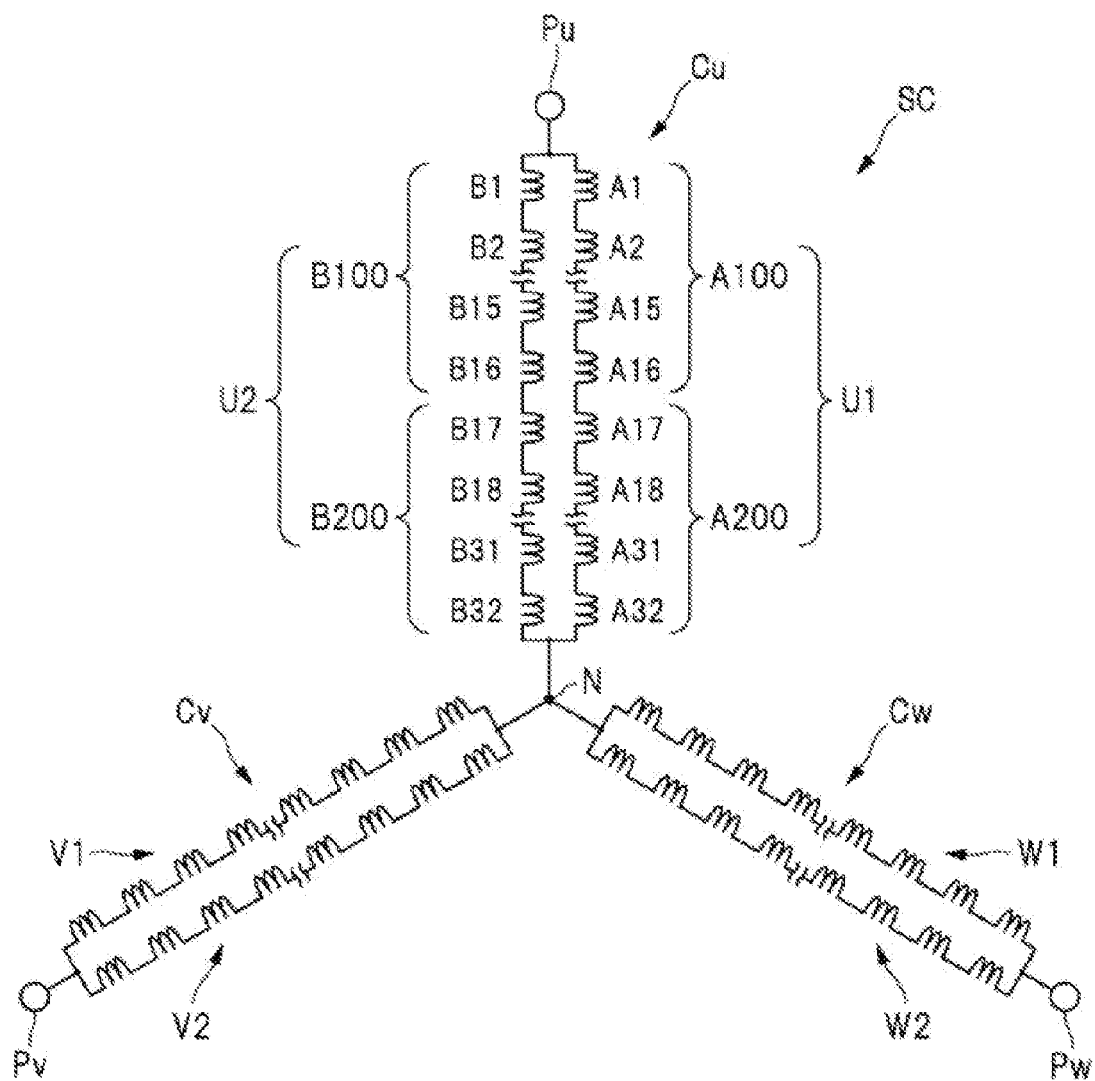
FIG. 10 is a diagram illustrating an example of a connection state of a stator winding.

FIG. 7 and FIG. 8 illustrate an example of a coil structure of the U-phase coil Cu. FIG. 9A illustrates an example of a first slot group S100 that accommodates a part of the U-phase coil Cu, and FIG. 9B illustrates an example of a second slot group S200 that accommodates a part of the U-phase coil Cu. FIG. 10 illustrates an example of a connection state of the stator winding SC. The following description describes the U-phase coil Cu, but the V-phase coil Cv and the W-phase coil Cw may also have similar coil structures. The above description assigns the segment coils with a numeral "30", whereas the following description assigns the segment coils with numerals "A1 to A32 and B1 to B32" in terms of distinguishing between the individual segment coils. In FIG. 7 and FIG. 8, the segment coils A16 and A17 may be coupled to each other in series, and the segment coils B16 and B17 may be coupled to each other in series.

As illustrated in FIG. 7 and FIG. 8, the U-phase coil Cu may include a pair of series coil groups U1 and U2 coupled to each other in parallel. The series coil group U1 may include the segment coils A1 to A32 coupled to each other in series, and the series coil group U2 may include the segment coils B1 to B32 coupled to each other in series. The series coil group U1 may include a first coil group A100 and a second coil group A200. The first coil group A100 may be a coil group including the segment coils A1 to A16 accommodated in the first slot group S100, and the second coil group A200 may be a coil group including the segment coils A17 to A32 accommodated in the second slot group S200. Similarly, the series coil group U2 may include a first coil group B100 and a second coil group B200. The first coil group B100 may be a coil group including the segment coils B1 to B16 accommodated in the first slot group S100, and the second coil group B200 may be a coil group including the segment coils B17 to B32 accommodated in the second slot group S200. In one embodiment, the series coil groups U1 and U2 may both serve as a "series conductor group". In one embodiment, the first coil groups A100 and B100 may serve as a "first conductor group" of the series coil groups, and the second coil groups A200 and B200 may serve as a "second conductor group" of the series coil groups. For example, the first coil group A100 and the second coil group A200 may respectively serve as the "first conductor group" and the "second conductor group" of the series coil group U1, and the first coil group B100 and the second coil group B200 may respectively serve as the "first conductor group" and the "second conductor group" of the series coil group U2. In one embodiment, the first slot group S100 may serve as a "first slot group", and the second slot group S200 may serve as a "second slot group". The first slot group S100 and the second slot group S200 will be described next.

As illustrated in FIG. 9A, the first slot group S100 that accommodates the first coil groups A100 and B100 may refer to a slot group that includes the slots S1, S7, S13, S19, S25, S31, S37, and S43 disposed to be evenly spaced (e.g., at an interval of 45 degrees) in the circumferential direction of the stator core 15. As illustrated in FIG. 9B, the second slot group S200 that accommodates the second coil groups A200 and B200 may refer to a slot group that includes the slots S2, S8, S14, S20, S26, S32, S38, and S44 disposed to be evenly spaced (e.g., at an interval of 45 degrees) in the circumferential direction of the stator core 15. In other words, the first slot group S100 may include the slots S1, S7, etc. disposed to be evenly spaced, and the second slot group S200 may include the slots S2, S8, etc. disposed to be evenly spaced and be phase-shifted from the first slot group S100.

Figure 11A:
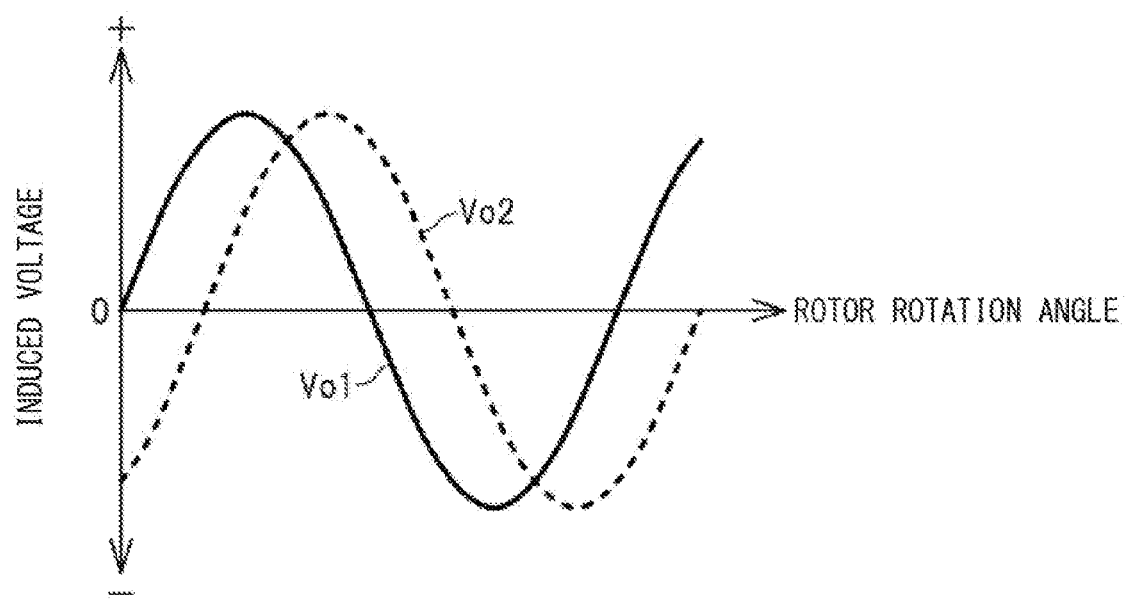
FIG. 11A is a diagram illustrating induced voltages generated in segment coils.
Figure 11B:
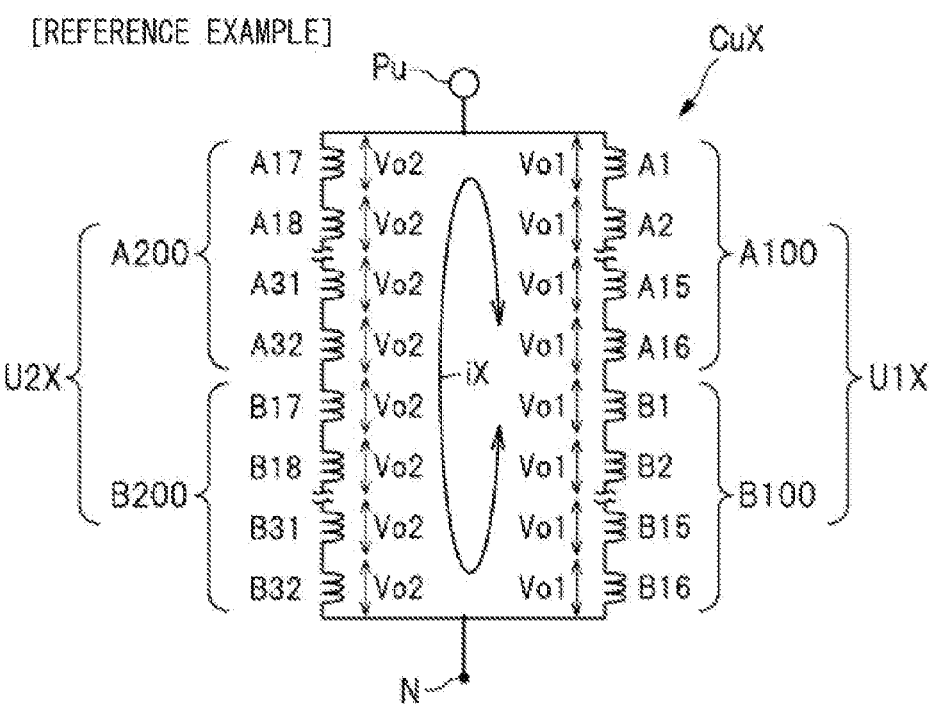
FIG. 11B is a diagram illustrating a U-phase coil serving as a reference example.

Positions of the first and second slot groups S100 and S200 may thus be shifted from each other in the circumferential direction. Accordingly, an induced voltage to be generated in the first coil groups A100 and B100 inserted into the first slot group S100 may differ from an induced voltage to be generated in the second coil groups A200 and B200 inserted into the second slot group S200. FIG. 11A illustrates induced voltages Vo1 and Vo2 generated in the segment coils, and FIG. 11B illustrates a U-phase coil CuX serving as a reference example. In FIG. 11A, the induced voltage Vo1 may refer to the induced voltage generated in the segment coils included in the first coil groups A100 and B100, i.e., the segment coils A1 to A16 and B1 to B16 inserted into the first slot group S100. The induced voltage Vo2 may refer to the induced voltage generated in the segment coils included in the second coil groups A200 and B200, i.e., the segment coils A17 to A32 and B17 to B32 inserted into the second slot group S200.

As illustrated in FIG. 11A, the induced voltages Vo1 and Vo2 may change periodically depending on a rotor rotation angle. The first and second slot groups S100 and S200 may be disposed to be shifted from each other. Thus, phases of the induced voltage Vo1 and the induced voltage Vo2 may be shifted from each other, causing a potential difference between the induced voltage Vo1 and the induced voltage Vo2. Therefore, as illustrated as the U-phase coil CuX in FIG. 11B, in a case where a series coil group U1X configuring one side of a parallel circuit includes the first coil groups A100 and B100, and a series coil group U2X configuring the other side of the parallel circuit includes the second coil groups A200 and B200, a potential difference may be caused between the series coil group U1X and the series coil group U2X. For example, the induced voltage Vo1 may be generated in the segment coils of the series coil group U1X, and the induced voltage Vo2 may be generated in the segment coils of the series coil group U2X. This causes the potential difference between the series coil groups U1X and U2X, causing circulating current ix to flow.

Figure 12A:
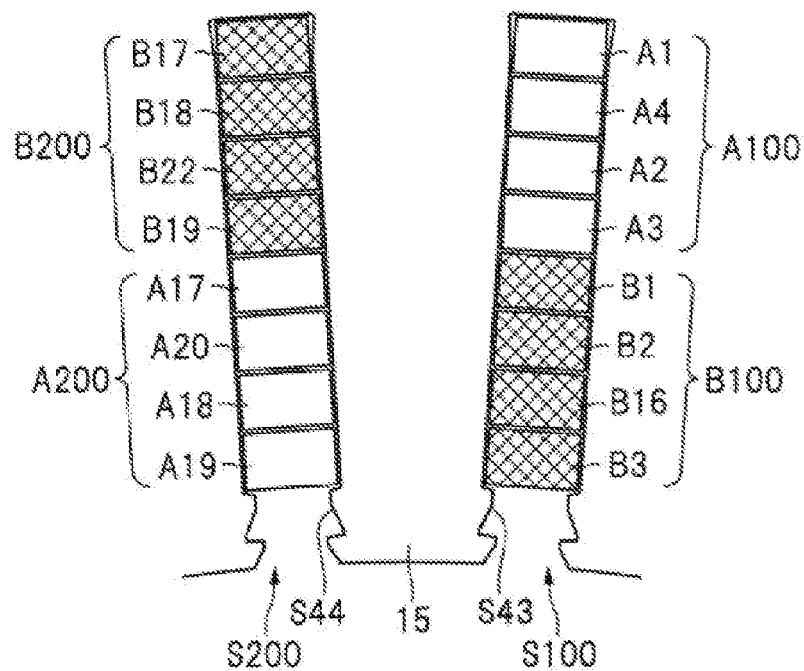
FIG. 12A is a partial enlarged view of slots of the stator core.

Hence, in the U-phase coil Cu of the stator 10 according to an example embodiment of the technology, to prevent generation of circulating current due to the induced voltages Vo1 and Vo2, the series coil group U1 configuring one side of a parallel circuit may include the first and second coil groups A100 and A200 in combination, and the series coil group U2 configuring the other side of the parallel circuit may include the first and second coil groups B100 and B200 in combination. FIG. 12A is a partial enlarged view of the slots S43 and S44 of the stator core 15, and FIG. 12B illustrates how the induced voltages Vo1 and Vo2 are generated in the U-phase coil Cu.

As illustrated in FIG. 12A, the segment coils accommodated in the slot S43 of the first slot group S100, i.e., the segment coils in which the induced voltage Vo1 is generated, may be classified into the first coil group A100 including the segment coils A1 to A4 and the first coil group B100 including the segment coils B1 to B3 and B16. Similarly, the segment coils accommodated in the slot S44 of the second slot group S200, i.e., the segment coils in which the induced voltage Vo2 is generated, may be classified into the second coil group A200 including the segment coils A17 to A20 and the second coil group B200 including the segment coils B17 to B19 and B22.

Figure 12B:
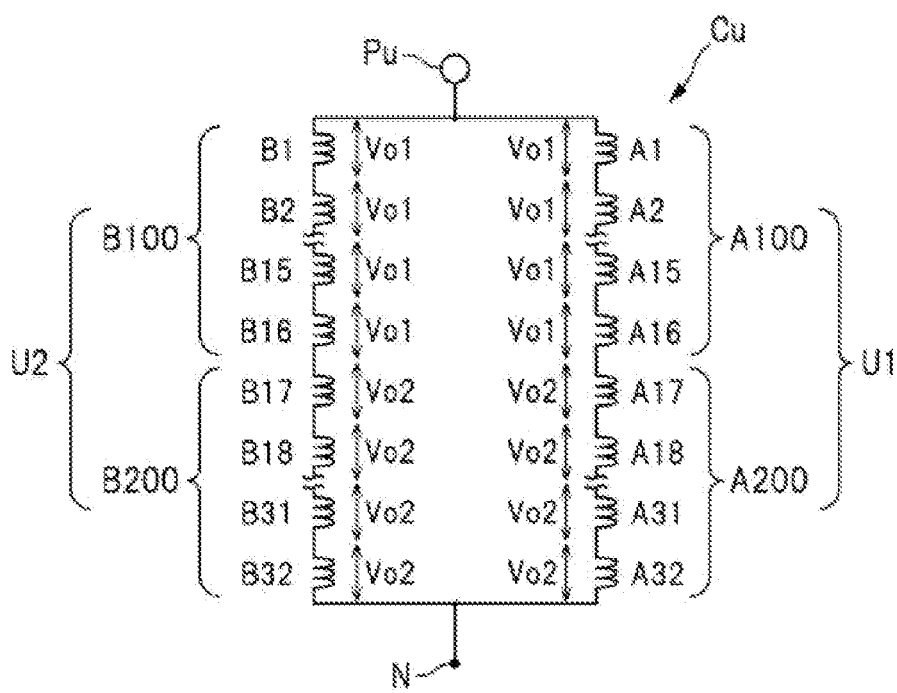
FIG. 12B is a diagram illustrating how the induced voltages are generated in the U-phase coil.

As illustrated in FIG. 12B, the first coil group A100 and the second coil group A200 may be coupled to each other in series to provide the series coil group U1 configuring one side of the parallel circuit of the U-phase coil Cu. In the series coil group U1, the induced voltage Vo1 may be generated in the segment coils A1 to A16 included in the first coil group A100, and the induced voltage Vo2 may be generated in the segment coils A17 to A32 included in the second coil group A200. Similarly, the first coil group B100 and the second coil group B200 may be coupled to each other in series to provide the series coil group U2 configuring the other side of the parallel circuit of the U-phase coil Cu. In the series coil group U2, the induced voltage Vo1 may be generated in the segment coils B1 to B16 included in the first coil group B100, and the induced voltage Vo2 may be generated in the segment coils B17 to B32 included in the second coil group B200.

As described above, the induced voltages Vo1 and Vo2 may be generated in the series coil groups U1 and U2 to match each other. This makes it possible to eliminate a potential difference between the series coil group U1 and the series coil group U2, making it possible to prevent generation of circulating current in the U-phase coil Cu. Also for the V-phase coil Cv and the W-phase coil Cw having similar coil structures, it is possible to prevent generation of circulating current in the V-phase coil Cv and the W-phase coil Cw. It is thus possible to prevent generation of circulating current in the stator winding SC, which helps to increase energy efficiency of the electric rotating machine 11.

As illustrated in FIG. 10, the power line terminal Pu may be coupled to one end of the U-phase coil Cu, and a neutral terminal N may be coupled to the other end of the U-phase coil Cu. Similarly, the power line terminal Pv may be coupled to one end of the V-phase coil Cv, and the neutral terminal N may be coupled to the other end of the V-phase coil Cv. Similarly, the power line terminal Pw may be coupled to one end of the W-phase coil Cw, and the neutral terminal N may be coupled to the other end of the W-phase coil Cw. The U-phase coil Cu, the V-phase coil Cv, and the W-phase coil Cw may thus be coupled to each other via the neutral terminal N, and the coils Cu, Cv, and Cw of the respective phases may configure the stator winding SC.

[Structure of U-Phase Coil]

Figure 13:
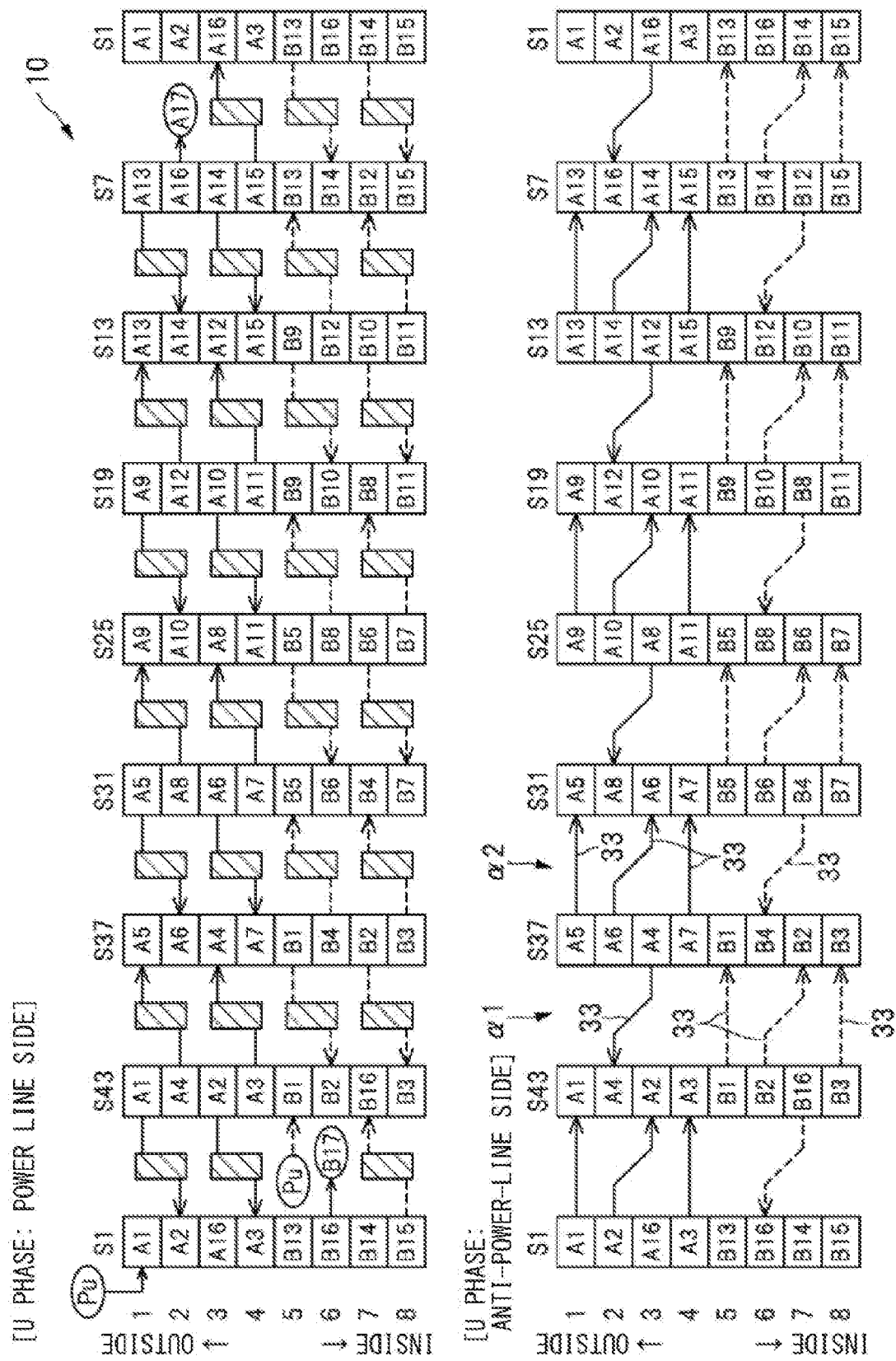
FIG. 13 is a diagram illustrating positions where segment coils are accommodated in slots of the stator core.
Figure 14:
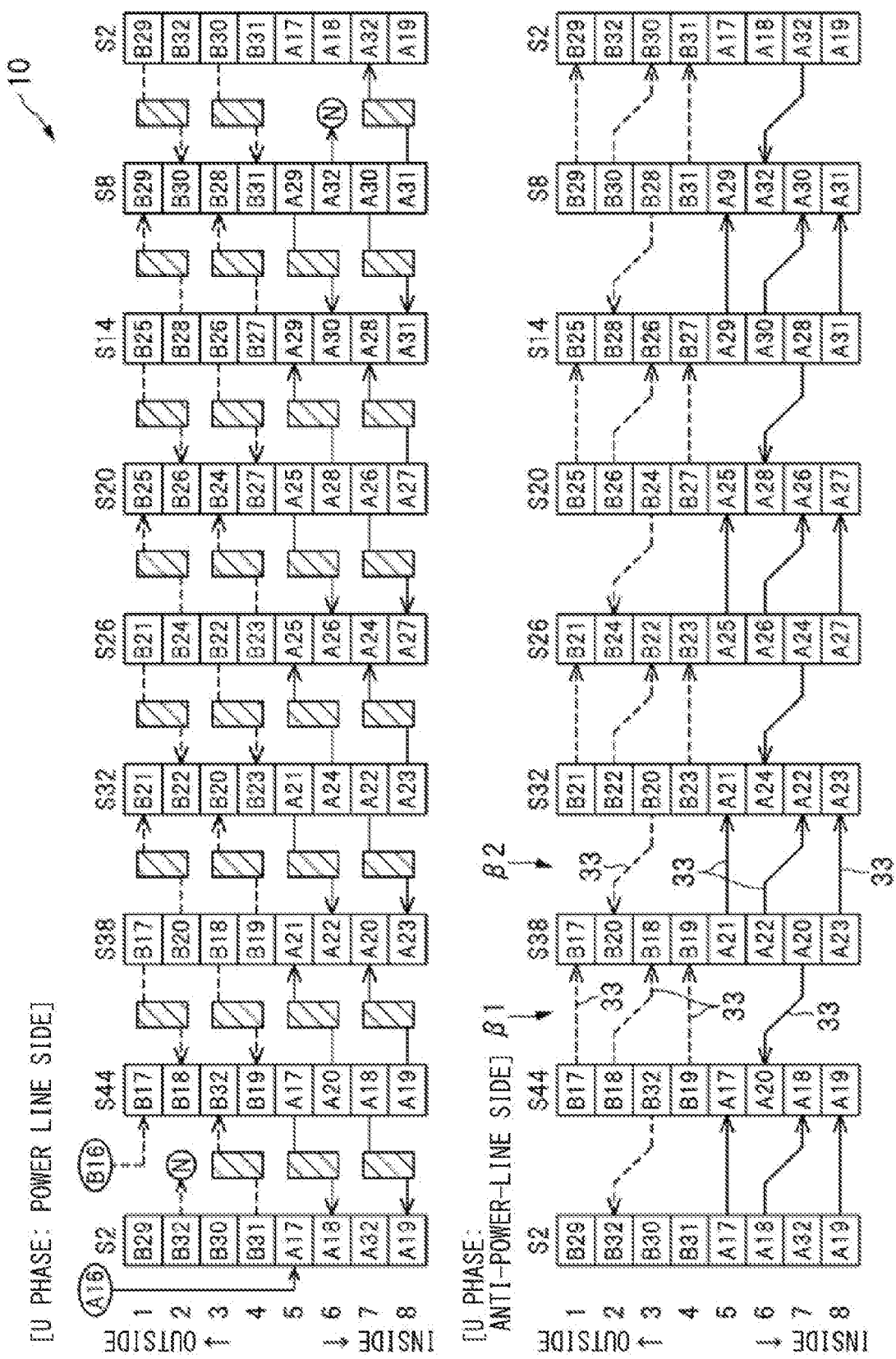
FIG. 14 is a diagram illustrating positions where segment coils are accommodated in slots of the stator core.

Now, a structure of the U-phase coil Cu will be described in detail. FIG. 13 illustrates positions where the segment coils A1 to A16 and B1 to B16 are accommodated in the slots S1, S7, etc. of the stator core 15. FIG. 14 illustrates positions where the segment coils A17 to A32 and B17 to B32 are accommodated in the slots S2, S8, etc. of the stator core 15.

The "power line side" illustrated in FIG. 13 and FIG. 14 may refer to, as illustrated in FIG. 1 and FIG. 4, a side on which the welding ends 34 and 35 of the segment coil 30 are positioned, i.e., a side on which the power line terminals Pu, Pv, and Pw are positioned. The "anti-power-line side" illustrated in FIG. 13 and FIG. 14 may refer to, as illustrated in FIG. 1 and FIG. 4, a side opposite to the power line side, i.e., a side on which the bend 33 of the segment coil 30 is positioned. The "inside" illustrated in FIG. 13 and FIG. 14 may refer to, as illustrated in FIG. 5, the inside of the stator core 15 in a radial direction, and the "outside" illustrated in FIG. 13 and FIG. 14 may refer to the outside of the stator core 15 in the radial direction. A direction of arrows illustrated in FIG. 13 and FIG. 14 may be a direction from the power line terminal Pu toward the neutral terminal N.

As illustrated in FIG. 10, the U-phase coil Cu may include the series coil groups U1 and U2 coupled to each other in parallel. The series coil group U1 may include the first and second coil groups A100 and A200, and the series coil group U2 may include the first and second coil groups B100 and B200.

[Series Coil Group U1]

As illustrated in FIG. 7, the first coil group A100 included in a part of the series coil group U1 may have a coil structure in which a connection pattern of four segment coils (e.g., A1 to A4) is repeated. As indicated by solid lines in FIG. 13, the segment coil A1 may be accommodated in first positions (outside positions) of the slots S1 and S43, and the segment coil A2 may be accommodated in a second position of the slot S1 and a third position of the slot S43. The segment coil A3 may be accommodated in fourth positions of the slots S1 and S43, and the segment coil A4 may be accommodated in the second position of the slot S43 and the third position of the slot S37.

Between the slots S1 and S43 on the power line side, the segment coil A1 protruding from the slot S43 and the segment coil A2 protruding from the slot S1 may be welded to each other. The segment coil A2 protruding from the slot S43 and the segment coil A3 protruding from the slot S1 may be welded to each other. Between the slots S43 and S37 on the power line side, the segment coil A3 protruding from the slot S43 and the segment coil A4 protruding from the slot S37 may be welded to each other. The segment coil A4 protruding from the slot S43 and the next segment coil A5 protruding from the slot S37 may be welded to each other. Such a connection pattern may be repeated to configure the first coil group A100 including the segment coils A1 to A16.

As illustrated in FIG. 8, the second coil group A200 included in a part of the series coil group U1 may have a coil structure in which a connection pattern of four segment coils (e.g., A17 to A20) is repeated. As indicated by solid lines in FIG. 14, the segment coil A17 may be accommodated in fifth positions of the slots S2 and S44, and the segment coil A18 may be accommodated in a sixth position of the slot S2 and a seventh position of the slot S44. The segment coil A19 may be accommodated in eighth positions (inside positions) of the slots S2 and S44, and the segment coil A20 may be accommodated in the sixth position of the slot S44 and the seventh position of the slot S38.

Between the slots S2 and S44 on the power line side, the segment coil A17 protruding from the slot S44 and the segment coil A18 protruding from the slot S2 may be welded to each other. The segment coil A18 protruding from the slot S44 and the segment coil A19 protruding from the slot S2 may be welded to each other. Between the slots S44 and S38 on the power line side, the segment coil A19 protruding from the slot S44 and the segment coil A20 protruding from the slot S38 may be welded to each other. The segment coil A20 protruding from the slot S44 and the next segment coil A21 protruding from the slot S38 may be welded to each other. Such a connection pattern may be repeated to configure the second coil group A200 including the segment coils A17 to A32.

[Series Coil Group U2]

As illustrated in FIG. 7, the first coil group B100 included in a part of the series coil group U2 may have a coil structure in which a connection pattern of four segment coils (e.g., B1 to B4) is repeated. As indicated by dashed lines in FIG. 13, the segment coil B1 may be accommodated in the fifth positions of the slots S43 and S37, and the segment coil B2 may be accommodated in the sixth position of the slot S43 and the seventh position of the slot S37. The segment coil B3 may be accommodated in the eighth positions of the slots S43 and S37, and the segment coil B4 may be accommodated in the sixth position of the slot S37 and the seventh position of the slot S31.

Between the slots S43 and S37 on the power line side, the segment coil B1 protruding from the slot S37 and the segment coil B2 protruding from the slot S43 may be welded to each other. The segment coil B2 protruding from the slot S37 and the segment coil B3 protruding from the slot S43 may be welded to each other. Between the slots S37 and S31 on the power line side, the segment coil B3 protruding from the slot S37 and the segment coil B4 protruding from the slot S31 may be welded to each other. The segment coil B4 protruding from the slot S37 and the next segment coil B5 protruding from the slot S31 may be welded to each other. Such a connection pattern may be repeated to configure the first coil group B100 including the segment coils B1 to B16.

As illustrated in FIG. 8, the second coil group B200 included in a part of the series coil group U2 may have a coil structure in which a connection pattern of four segment coils (e.g., B17 to B20) is repeated. As indicated by dashed lines in FIG. 14, the segment coil B17 may be accommodated in the first positions of the slots S44 and S38, and the segment coil B18 may be accommodated in the second position of the slot S44 and the third position of the slot S38. The segment coil B19 may be accommodated in the fourth positions of the slots S44 and S38, and the segment coil B20 may be accommodated in the second position of the slot S38 and the third position of the slot S32.

Between the slots S44 and S38 on the power line side, the segment coil B17 protruding from the slot S38 and the segment coil B18 protruding from the slot S44 may be welded to each other. The segment coil B18 protruding from the slot S38 and the segment coil B19 protruding from the slot S44 may be welded to each other. Between the slots S38 and S32 on the power line side, the segment coil B19 protruding from the slot S38 and the segment coil B20 protruding from the slot S32 may be welded to each other. The segment coil B20 protruding from the slot S38 and the next segment coil B21 protruding from the slot S32 may be welded to each other. Such a connection pattern may be repeated to configure the second coil group B200 including the segment coils B17 to B32.

[Overview of Downsizing of Coil End]

As indicated by a numeral "α1" in FIG. 13, in the slot S37, four bends 33 may extend in one of circumferential directions of the stator core 15 from the slot S37 toward the slot S43. As indicated by a numeral "α2", in the slot S37, four bends 33 may extend in the other of the circumferential directions of the stator core 15 from the slot S37 toward the slot S31. Thus, the number of the bends 33 extending in one of the circumferential directions may match the number of the bends 33 extending in the other of the circumferential directions in the slot S37.

As indicated by a numeral "β1" in FIG. 14, in the slot S38, four bends 33 may extend in one of the circumferential directions of the stator core 15 from the slot S38 toward the slot S44. As indicated by a numeral "β2", in the slot S38, four bends 33 may extend in the other of the circumferential directions of the stator core 15 from the slot S38 toward the slot S32. Thus, the number of the bends 33 extending in one of the circumferential directions may match the number of the bends 33 extending in the other of the circumferential directions in the slot S38.

Disposing the segment coils A1 to A32 and B1 to B32 as illustrated in FIG. 13 and FIG. 14 makes it possible to, in each of the slots S1, S2, S7, S8, etc. open to the anti-power-line side, make the number of the bends 33 protruding from the end face 40 of the stator core 15 to extend in one of the circumferential directions match the number of the bends 33 protruding from the end face 40 of the stator core 15 to extend in the other of the circumferential directions. Thus making the number of the bends 33 extending from each of the slots S1, S2, S7, S8, etc. match between in the one circumferential direction and in the other circumferential direction makes it possible to downsize a coil end Ce that includes the bends 33 protruding from the end face 40, i.e., the coil end Ce provided on the anti-power-line side. In other words, it is possible to cause an equal number of bends 33 to be included in each cross-section of the ring-shaped coil end Ce taken along the radial direction. This makes it possible to prevent the bends 33 of the segment coils 30 from overlapping complicatedly, which helps to downsize the coil end Ce.

For example, in a case where the number of turns of the stator 10, i.e., the number of the segment coils 30 to be inserted into one slot, is defined as "4n" (n may be an integer of 2 or more), the number of the bends 33 protruding from the end face 40 of the stator core 15 to extend in one of the circumferential directions may be set to "4n/2", and the number of the bends 33 protruding from the end face 40 of the stator core 15 to extend in the other of the circumferential directions may be set to "4n/2". Thus attaching the segment coils 30 to the slots enables an equal number of bends 33 to be included in each cross-section of the ring-shaped coil end Ce taken along the radial direction. This makes it possible to prevent the bends 33 of the segment coils 30 from overlapping complicatedly, which helps to downsize the coil end Ce.

[Details of Downsizing of Coil End]

Figure 15:
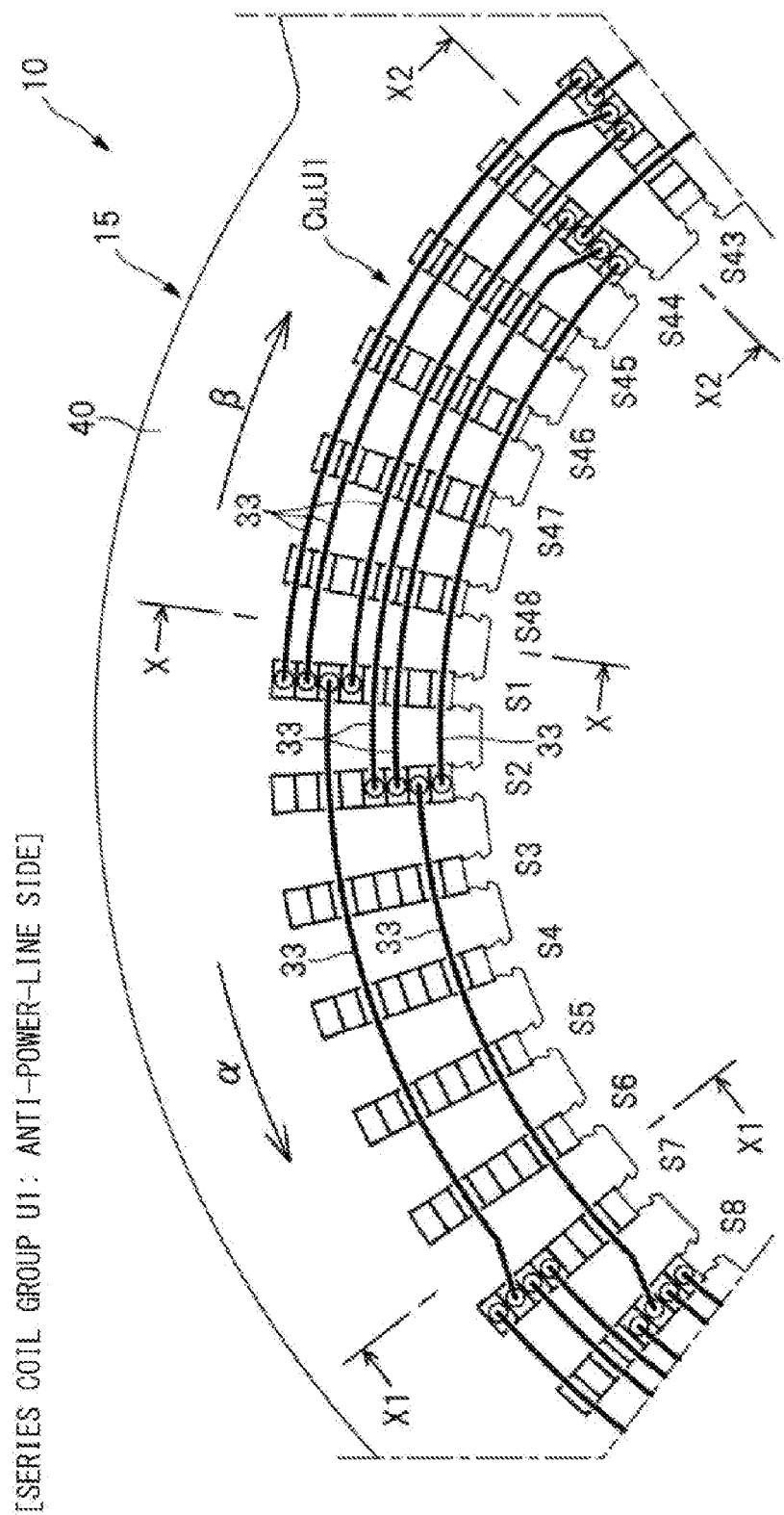
FIG. 15 is a diagram illustrating a series coil group of the U-phase coil disposed on an anti-power-line side of the stator core.
Figure 16:
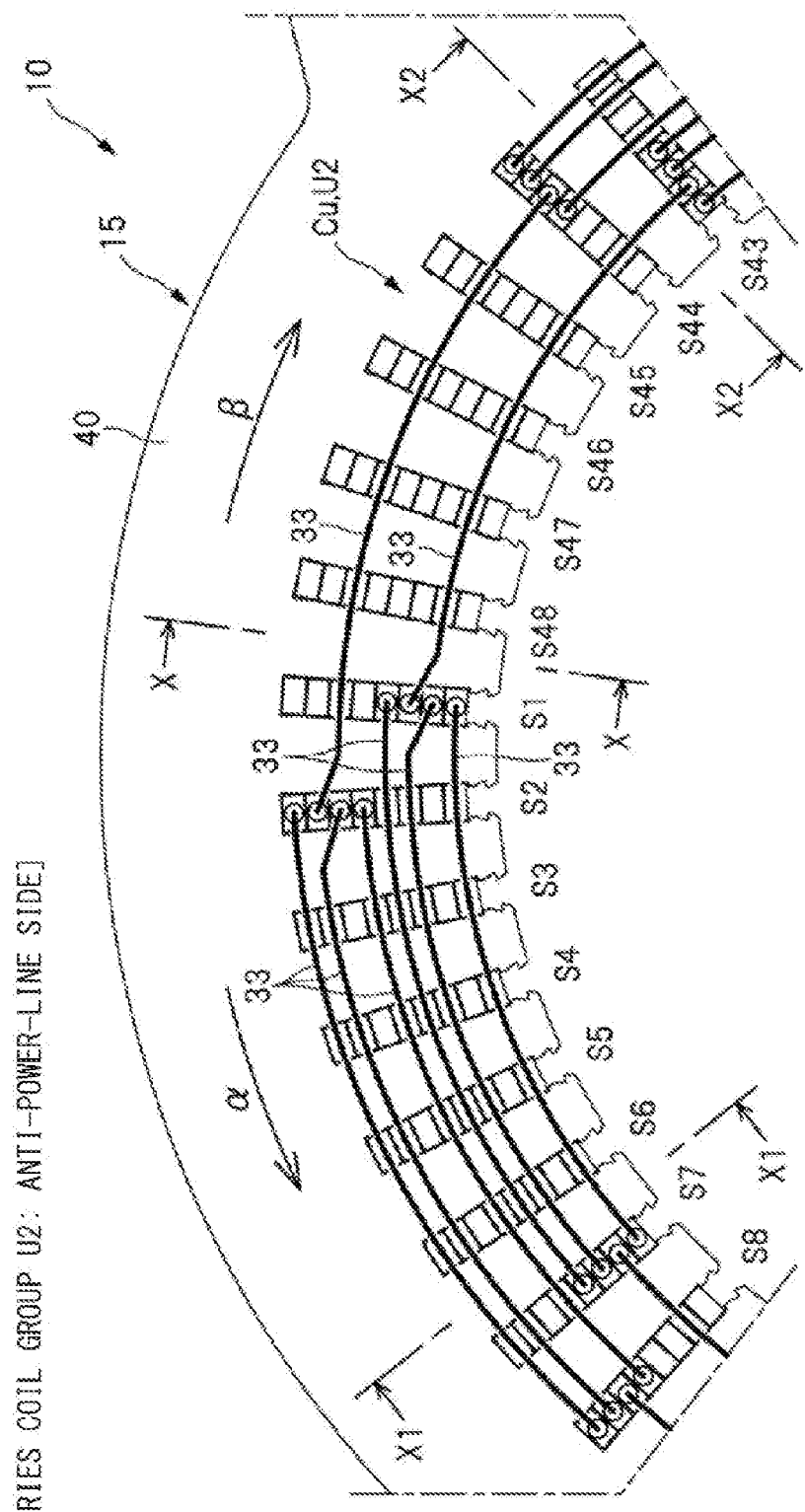
FIG. 16 is a diagram illustrating a series coil group of the U-phase coil disposed on the anti-power-line side of the stator core.
Figure 17:
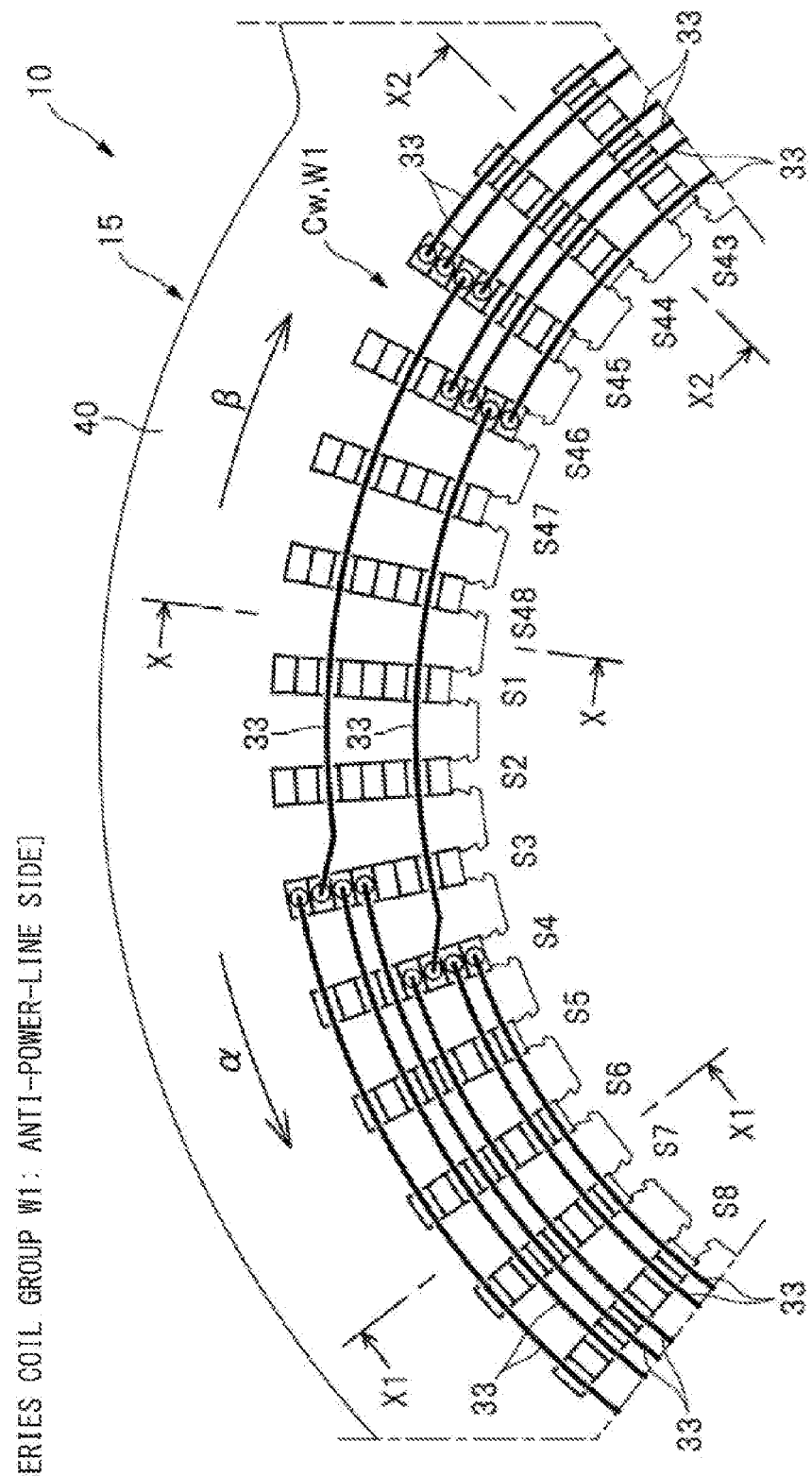
FIG. 17 is a diagram illustrating a series coil group of a W-phase coil disposed on the anti-power-line side of the stator core.
Figure 18:
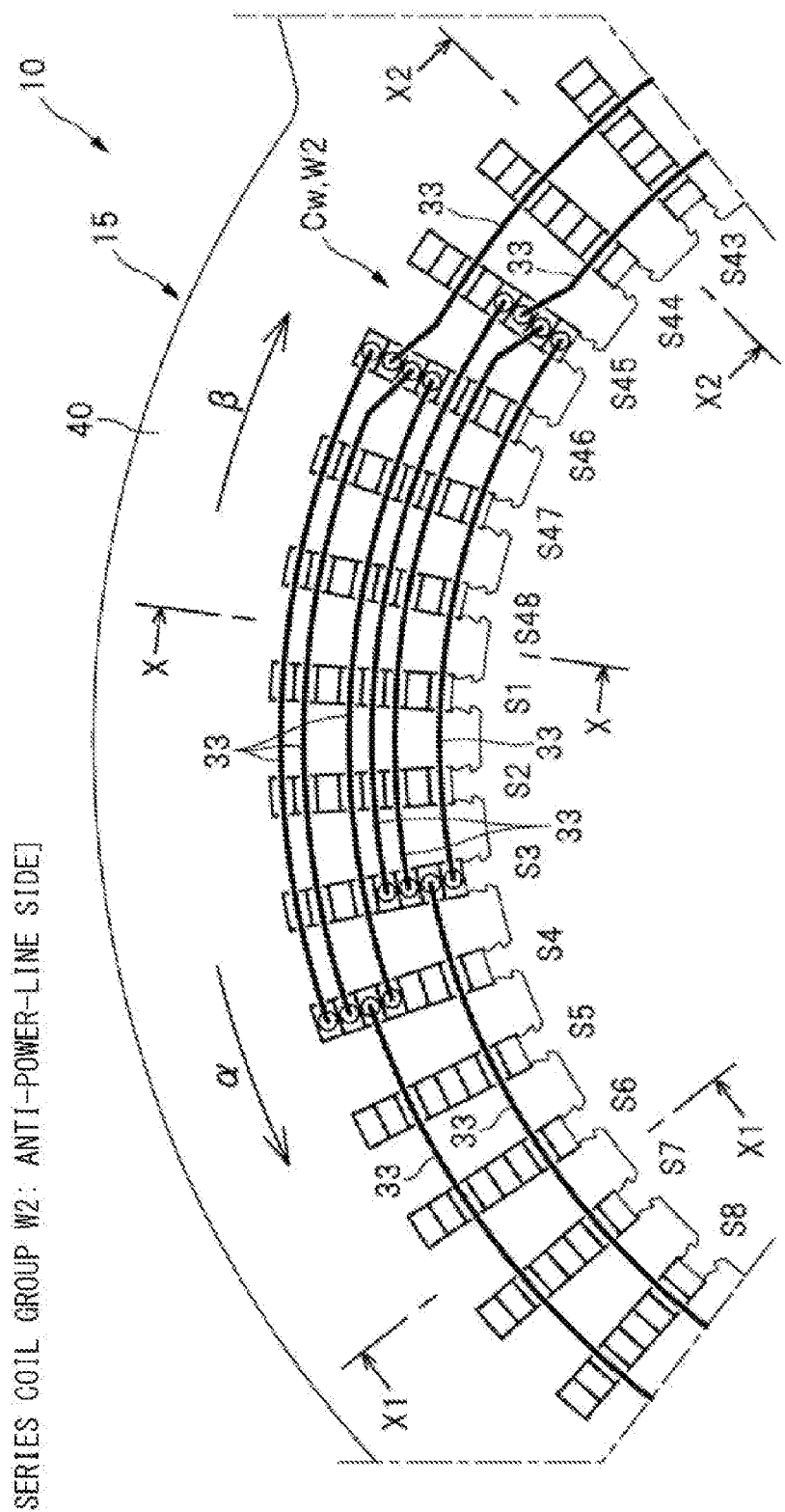
FIG. 18 is a diagram illustrating a series coil group of the W-phase coil disposed on the anti-power-line side of the stator core.
Figure 19:
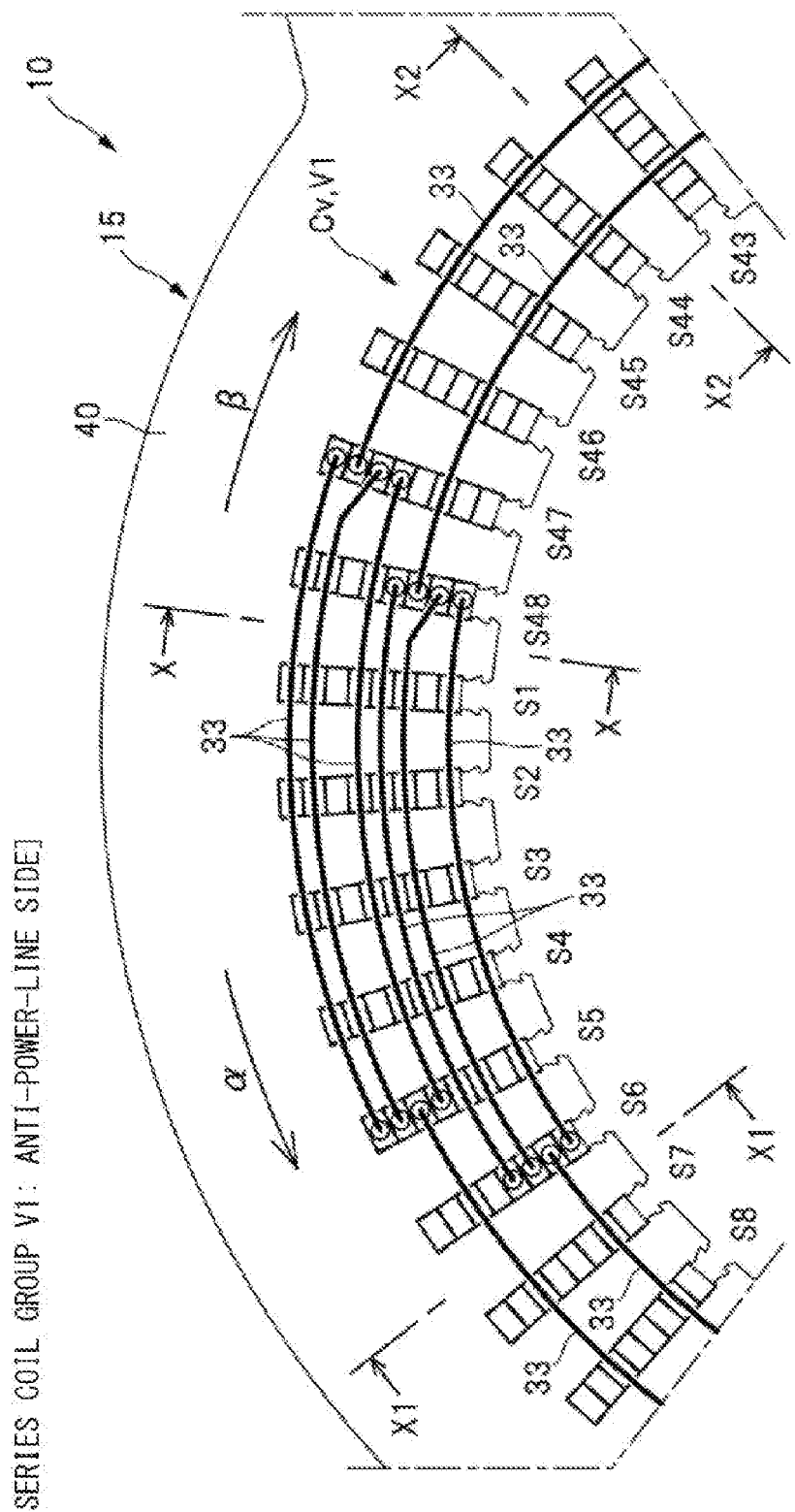
FIG. 19 is a diagram illustrating a series coil group of a V-phase coil disposed on the anti-power-line side of the stator core.
Figure 20:
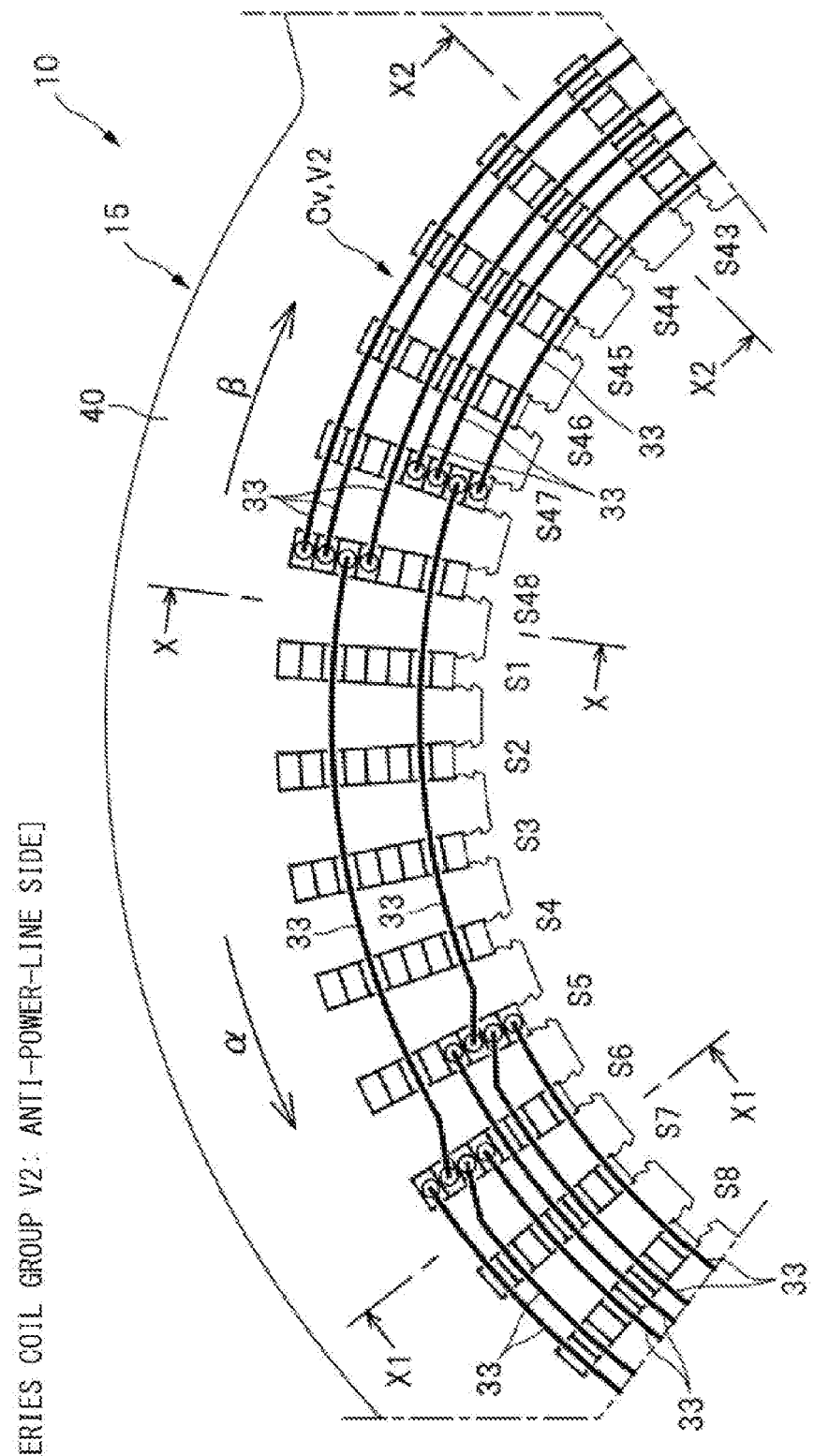
FIG. 20 is a diagram illustrating a series coil group of the V-phase coil disposed on the anti-power-line side of the stator core.

FIG. 15 illustrates the series coil group U1 of the U-phase coil Cu disposed on the anti-power-line side of the stator core 15. FIG. 16 illustrates the series coil group U2 of the U-phase coil Cu disposed on the anti-power-line side of the stator core 15. FIG. 17 illustrates a series coil group W1 of the W-phase coil Cw disposed on the anti-power-line side of the stator core 15. FIG. 18 illustrates a series coil group W2 of the W-phase coil Cw disposed on the anti-power-line side of the stator core 15. FIG. 19 illustrates a series coil group V1 of the V-phase coil Cv disposed on the anti-power-line side of the stator core 15. FIG. 20 illustrates a series coil group V2 of the V-phase coil Cv disposed on the anti-power-line side of the stator core 15.

As illustrated in FIG. 15, on the end face 40 side of the stator core 15, one bend 33 extending from the slot S1 in one of the circumferential directions (arrow α direction) may be disposed, and three bends 33 extending from the slot S1 in the other of the circumferential directions (arrow β direction) may be disposed. In addition, one bend 33 extending from the slot S2 in one of the circumferential directions (arrow α direction) may be disposed, and three bends 33 extending from the slot S2 in the other of the circumferential directions (arrow β direction) may be disposed. Accordingly, in a cross-section taken along line X-X between the slots S1 and S48, six bends 33 may be disposed as the bends 33 of the series coil group U1.

As illustrated in FIG. 16, on the end face 40 side of the stator core 15, three bends 33 extending from the slot S1 in one of the circumferential directions (arrow α direction) may be disposed, and one bend 33 extending from the slot S1 in the other of the circumferential directions (arrow β direction) may be disposed. In addition, three bends 33 extending from the slot S2 in one of the circumferential directions (arrow α direction) may be disposed, and one bend 33 extending from the slot S2 in the other of the circumferential directions (arrow β direction) may be disposed. Accordingly, in the cross-section taken along line X-X between the slots S1 and S48, two bends 33 may be disposed as the bends 33 of the series coil group U2.

As illustrated in FIG. 17, on the end face 40 side of the stator core 15, three bends 33 extending from the slot S3 in one of the circumferential directions (arrow α direction) may be disposed, and one bend 33 extending from the slot S3 in the other of the circumferential directions (arrow β direction) may be disposed. In addition, three bends 33 extending from the slot S4 in one of the circumferential directions (arrow α direction) may be disposed, and one bend 33 extending from the slot S4 in the other of the circumferential directions (arrow β direction) may be disposed. Accordingly, in the cross-section taken along line X-X between the slots S1 and S48, two bends 33 may be disposed as the bends 33 of the series coil group W1.

As illustrated in FIG. 18, on the end face 40 side of the stator core 15, one bend 33 extending from the slot S3 in one of the circumferential directions (arrow α direction) may be disposed, and three bends 33 extending from the slot S3 in the other of the circumferential directions (arrow β direction) may be disposed. In addition, one bend 33 extending from the slot S4 in one of the circumferential directions (arrow α direction) may be disposed, and three bends 33 extending from the slot S4 in the other of the circumferential directions (arrow β direction) may be disposed. Accordingly, in the cross-section taken along line X-X between the slots S1 and S48, six bends 33 may be disposed as the bends 33 of the series coil group W2.

As illustrated in FIG. 19, on the end face 40 side of the stator core 15, one bend 33 extending from the slot S5 in one of the circumferential directions (arrow α direction) may be disposed, and three bends 33 extending from the slot S5 in the other of the circumferential directions (arrow β direction) may be disposed. In addition, one bend 33 extending from the slot S6 in one of the circumferential directions (arrow α direction) may be disposed, and three bends 33 extending from the slot S6 in the other of the circumferential directions (arrow β direction) may be disposed. Accordingly, in the cross-section taken along line X-X between the slots S1 and S48, six bends 33 may be disposed as the bends 33 of the series coil group V1.

As illustrated in FIG. 20, on the end face 40 side of the stator core 15, three bends 33 extending from the slot S5 in one of the circumferential directions (arrow α direction) may be disposed, and one bend 33 extending from the slot S5 in the other of the circumferential directions (arrow β direction) may be disposed. In addition, three bends 33 extending from the slot S6 in one of the circumferential directions (arrow α direction) may be disposed, and one bend 33 extending from the slot S6 in the other of the circumferential directions (arrow β direction) may be disposed. Accordingly, in the cross-section taken along line X-X between the slots S1 and S48, two bends 33 may be disposed as the bends 33 of the series coil group V2.

Figure 21:
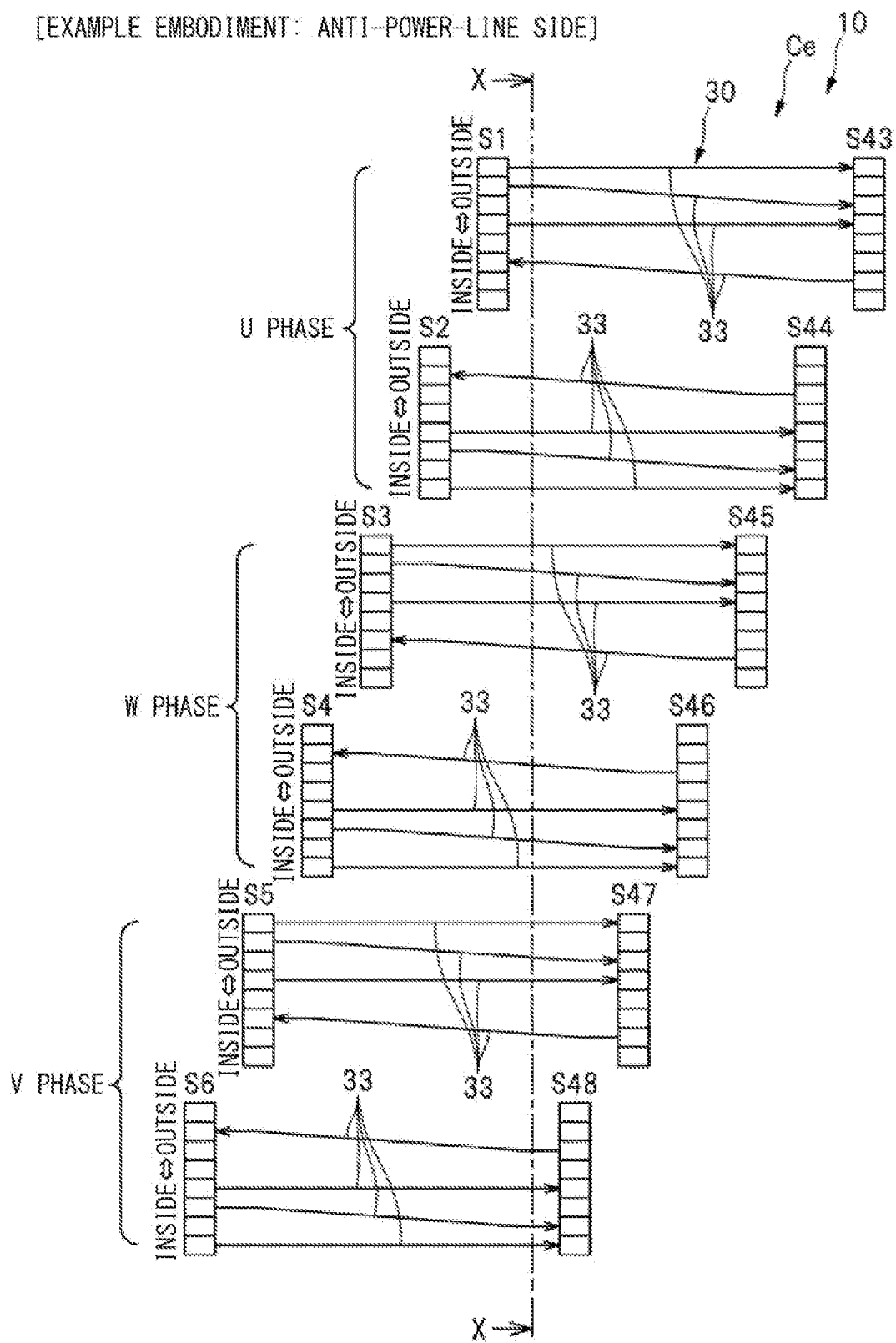
FIG. 21 is a diagram illustrating the number of bends included in a cross-section of a coil end.

FIG. 21 illustrates the number of the bends 33 included in a cross-section of the coil end Ce. FIG. 21 illustrates the bends 33 that intersect the cross-section taken along line X-X illustrated in FIG. 15 to FIG. 20. As illustrated in FIG. 21, the cross-section of the coil end Ce taken along line X-X between the slots S1 and S48 may include eight bends 33 for each phase, i.e., twenty-four bends 33 in total for the three phases. As illustrated in FIG. 15 to FIG. 20, any other cross-section of the coil end Ce, i.e., a cross-section other than that taken along line X-X, may also include eight bends 33 for each phase, i.e., twenty-four bends 33 in total for the three phases. For example, a cross-section taken along line X1-X1 illustrated in FIG. 15 to FIG. 20, i.e., a cross-section of the coil end Ce taken along the radial direction between the slots S6 and S7, may also include twenty-four bends 33 in total for the three phases. A cross-section taken along line X2-X2 illustrated in FIG. 15 to FIG. 20, i.e., a cross-section of the coil end Ce taken along the radial direction between the slots S43 and S44, may also include twenty-four bends 33 in total for the three phases.

As described above, the numbers of the bends 33 included in respective cross-sections of the coil end Ce taken between the slots may match each other. This enables each cross-section of the coil end Ce to include an equal number of bends 33, making it possible to prevent the bends 33 of the segment coils 30 from overlapping complicatedly. This helps to downsize the coil end Ce.

Comparative Example

Now, a stator 100 according to a comparative example will be described. FIG. 22 illustrates positions of the bends 33 of the segment coils 30 included in the stator 100 according to the comparative example. FIG. 22 illustrates the positions of the bends 33 of the segment coils 30 disposed on the anti-power-line side. Although FIG. 22 illustrates a U-phase coil included in a part of a stator winding, a V-phase coil and a W-phase coil also have the same coil structure as that of the U-phase coil. It is to be noted that the stator 100 according to the comparative example includes the same stator core as the stator core 15 according to the example embodiment. The number of the segment coils 30 attached to the stator 100 according to the comparative example is the same as the number of the segment coils 30 attached to the stator 10 according to the example embodiment.

As indicated by a numeral "α1" in FIG. 22, in the slot S37, two bends 33 extend in one of the circumferential directions of the stator core 15 from the slot S37 toward the slot S43. As indicated by a numeral "α2", in the slot S37, six bends 33 extend in the other of the circumferential directions of the stator core 15 from the slot S37 toward the slot S31. Thus, the number of the bends 33 extending in one of the circumferential directions differs from the number of the bends 33 extending in the other of the circumferential directions in the slot S37.

As indicated by a numeral "β1" in FIG. 22, in the slot S38, two bends 33 extend in one of the circumferential directions of the stator core 15 from the slot S38 toward the slot S44. As indicated by a numeral "β2", in the slot S38, six bends 33 extend in the other of the circumferential directions of the stator core 15 from the slot S38 toward the slot S32. Thus, the number of the bends 33 extending in one of the circumferential directions differs from the number of the bends 33 extending in the other of the circumferential directions in the slot S38.

Figure 23:
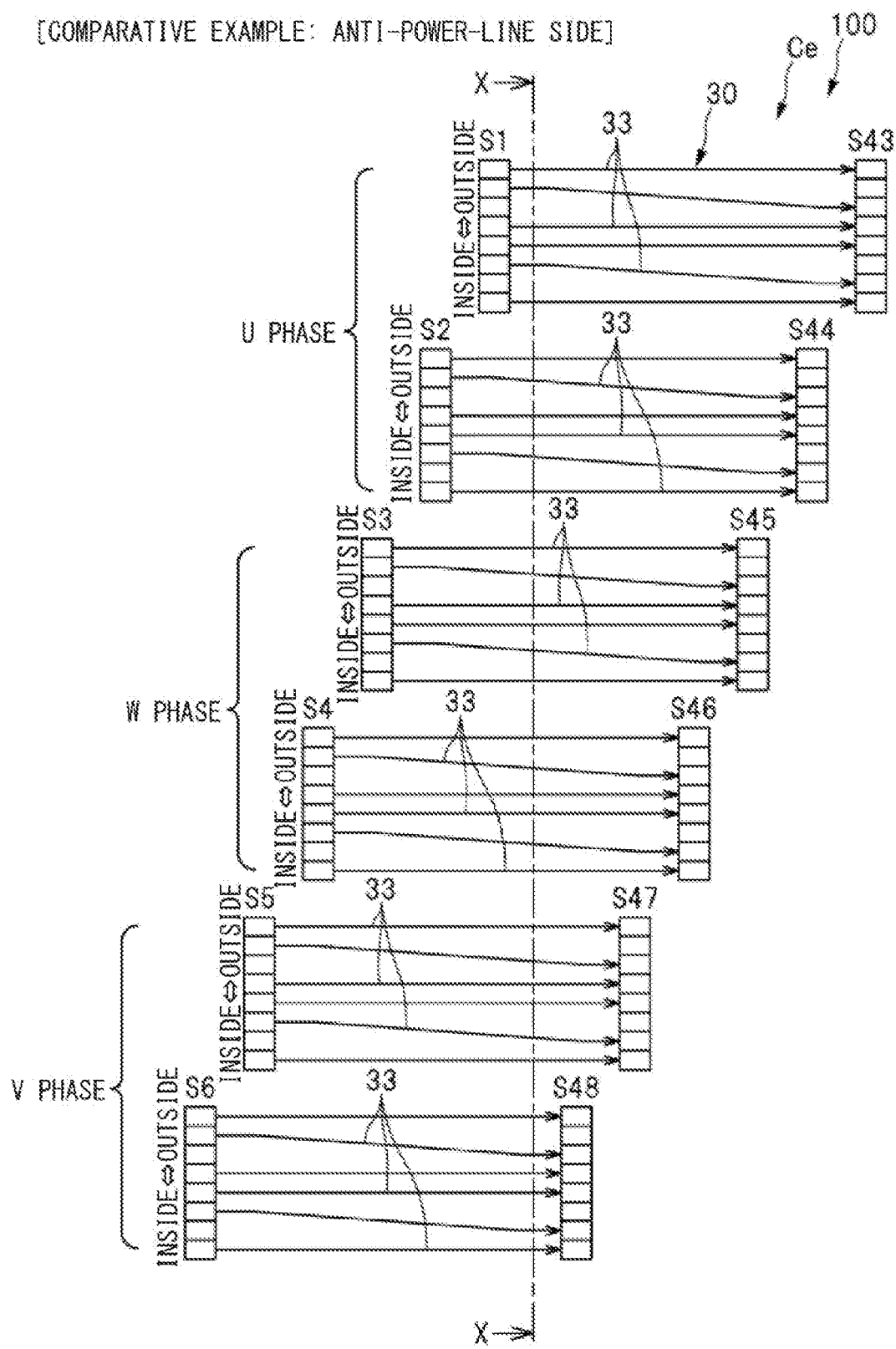
FIG. 23 is a diagram illustrating the number of bends included in a cross-section of a coil end of the stator according to the comparative example.

FIG. 23 illustrates the number of the bends 33 included in a cross-section of the coil end Ce of the stator 100 according to the comparative example. FIG. 23 illustrates all the bends 33 that intersect a cross-section taken along line X-X between the slots S1 and S48. As illustrated in FIG. 23, the cross-section of the coil end Ce taken along line X-X between the slots S1 and S48 includes thirty-six bends 33 in total. In other words, in the stator 100 according to the comparative example, the cross-section of the coil end Ce taken along line X-X between the slots S1 and S48 includes a larger number of bends 33 than in the stator 10 according to the example embodiment illustrated in FIG. 21.

As illustrated in FIG. 22, in a case where the number of the bends 33 extending from each of the slots differs between the one circumferential direction and in the other circumferential direction, the number of the bends 33 included in cross-sections of the coil end Ce can increase locally. Such a variation in the number of the bends 33 included in each cross-section of the coil end Ce can cause the bends 33 of the segment coils 30 to overlap each other complicatedly, and can result in an increase in size of the coil end Ce on the anti-power-line side. To further downsize the electric rotating machine or the stator provided in the electric rotating machine, the coil end Ce of the stator coil is to be made smaller. In making the coil end Ce smaller to downsize the electric rotating machine or the stator, it is advantageous to appropriately arrange the segment coils 30 to be coupled. Making the number of the bends 33 extending from each of the slots match between in the one circumferential direction and in the other circumferential direction enables each cross-section of the coil end Ce to include an equal number of bends 33. This makes it possible to prevent the bends 33 of the segment coils 30 from overlapping complicatedly, and downsize the coil end Ce. This helps to promote downsizing of the electric rotating machine and the stator.

The technology is not limited to the example embodiments, and various modifications may be made without departing from the scope of the technology. In the above description, two series coil groups may be coupled to each other in parallel to configure the phase winding for one phase. Without being limited to this example, three or more series coil groups may be coupled to each other in parallel to configure the phase winding for one phase. In the above description, one series coil group may include the first coil group and the second coil group. Without being limited to this example, one series coil group may include three or more coil groups. In this case, another slot group may be provided for the stator core to be phase-shifted from the first and second slot groups. In the illustrated example, eight segment coils may be inserted into one slot. Without being limited to this example, more than eight segment coils may be inserted into one slot, or less than eight segment coils may be inserted into one slot. In the above description, the stator core 15 including 48 slots may be used. Without being limited to this example, the stator core 15 to be used may include another number of slots.

The invention claimed is:

1. A stator to be provided in an electric rotating machine, the stator comprising:
a stator core having a cylindrical shape and a plurality of slots; and
a stator winding that includes a plurality of phase windings each including a plurality of segment conductors inserted into the slots and coupled to each other in series,
wherein each of the segment conductors has a pair of straight parts and a bend, the pair of straight parts being accommodated in two of the plurality of slots, the bend protruding from an end face of the stator core and coupling the pair of straight parts to each other, and,
in each of the plurality of slots, number of the bends protruding from the end face of the stator core to extend in one of circumferential directions matches number of the bends protruding from the end face of the stator core to extend in the other of the circumferential directions, wherein
the phase windings include
a first coil including first segment conductors out of the segment conductors, straight parts of the first segment conductors configured to be inserted into
a first slot out of the plurality of the slots and a second slot far from the first slot by a predetermined number of slots in circumferential direction, a second coil including second segment conductors out of the segment conductors, straight parts of the second segment conductors configured to be inserted into a third slot far from the second slot by the predetermined number of slots in the circumferential direction and a fourth slot far from the third slot by the predetermined number of slots in the circumferential direction, and a single coil being a segment conductor out of the plurality of segment conductors, straight parts of the single coil configured to be inserted into the second slot and the third slot, and coupled with the first coil and the second coil in series.

2. The stator according to claim 1, wherein
each of the phase windings includes a plurality of series conductor groups coupled to each other in parallel, and
each of the series conductor groups includes the plurality of segment conductors coupled to each other in series.

3. The stator according to claim 2, wherein each of series conductor groups includes a first conductor group accommodated in a first slot group and a second conductor group accommodated in a second slot group, the first slot group including two or more slots disposed to be evenly spaced, out of the plurality of slots, the second slot group including two or more slots disposed to be evenly spaced and be shifted from the first slot group in the circumferential direction, out of the plurality of slots.

4. The stator according to claim 3, further comprising a ring-shaped coil end that includes the bends protruding from the end face of the stator core,
wherein numbers of the bends included in respective cross-sections of the coil end match each other, the cross-sections being taken between the slots.

5. The electric rotating machine comprising:
the stator according to claim 4; and
a rotor including a plurality of permanent magnets arranged in the circumferential directions, and provided on an inner circumference side of the stator to be relatively rotatable with respect to the stator.

6. An electric-powered vehicle comprising the electric rotating machine according to claim 5 as a driving source.

7. The electric rotating machine comprising:
the stator according to claim 3; and
a rotor including a plurality of permanent magnets arranged in the circumferential directions, and provided on an inner circumference side of the stator to be relatively rotatable with respect to the stator.

8. An electric-powered vehicle comprising the electric rotating machine according to claim 7 as a driving source.

9. The stator according to claim 2, further comprising a ring-shaped coil end that includes the bends protruding from the end face of the stator core,
wherein numbers of the bends included in respective cross-sections of the coil end match each other, the cross-sections being taken between the plurality of slots.

10. The electric rotating machine comprising:
the stator according to claim 9; and
a rotor including a plurality of permanent magnets arranged in the circumferential directions, and provided on an inner circumference side of the stator to be relatively rotatable with respect to the stator.

11. An electric-powered vehicle comprising the electric rotating machine according to claim 10 as a driving source.

12. The electric rotating machine comprising:
the stator according to claim 2; and
a rotor including a plurality of permanent magnets arranged in the circumferential directions, and provided on an inner circumference side of the stator to be relatively rotatable with respect to the stator.

13. An electric-powered vehicle comprising the electric rotating machine according to claim 12 as a driving source.

14. The stator according to claim 2, wherein induced voltages are generated in the series conductor groups to match each other, and
wherein each of the plurality of phase windings have a same coil structure.

15. The stator according to claim 1, further comprising a ring-shaped coil end that includes the bends protruding from the end face of the stator core,
wherein numbers of the bends included in respective cross-sections of the coil end match each other, the cross-sections being taken between the plurality of slots.

16. The electric rotating machine comprising:
the stator according to claim 15; and
a rotor including a plurality of permanent magnets arranged in the circumferential directions, and provided on an inner circumference side of the stator to be relatively rotatable with respect to the stator.

17. An electric-powered vehicle comprising the electric rotating machine according to claim 16 as a driving source.

18. The electric rotating machine comprising:
the stator according to claim 1; and
a rotor including a plurality of permanent magnets arranged in the circumferential directions, and provided on an inner circumference side of the stator to be relatively rotatable with respect to the stator.

19. An electric-powered vehicle comprising the electric rotating machine according to claim 18 as a driving source.

20. A stator to be provided in an electric rotating machine, the stator comprising:
a stator core having a cylindrical shape and a plurality of slots; and
a stator winding that includes a plurality of phase windings each including a plurality of segment conductors inserted into the slots and coupled to each other in series, wherein
the phase windings include
a first coil including first segment conductors out of the segment conductors, straight parts of the first segment conductors configured to be inserted into
a first slot out of the plurality of the slots and
a second slot far from the first slot by a predetermined number of slots in circumferential direction,
a second coil including second segment conductors out of the segment conductors, straight parts of the second segment conductors configured to be inserted into
a third slot far from the second slot by the predetermined number of slots in the circumferential direction and
a fourth slot far from the third slot by the predetermined number of slots in the circumferential direction, and
a single coil being a segment conductor out of the plurality of segment conductors, straight parts of the single coil configured to be inserted into the second slot and the third slot, and coupled with the first coil and the second coil in series, the plurality of slots includes
- a first slot group including a plurality of first slots disposed to be evenly spaced, out of the plurality of slots, and
- a second slot group shifted from the first slot group in the circumferential direction and including a plurality of second slots disposed to be evenly spaced, out of the plurality of slots, each of the segment conductors has
- a pair of straight parts accommodated in two of the plurality of slots, and
- a bend protruding from an end face of the stator core and coupling the pair of straight parts to each other, each of the phase windings includes a first series conductor group and a second series conductor group coupled to each other in parallel and each including the plurality of segment conductors coupled to each other in series, the first series conductor group includes a first conductor group and a second conductor group that include segment conductors equal in number to each other, out of the plurality of segment conductors, the second series conductor group includes a third conductor group and a fourth conductor group that include segment conductors equal in number to each other, out of the plurality of segment conductors, the segment conductors of the first series conductor group are classified into the first conductor group inserted into the first slot group and the second conductor group inserted into the second slot group, and the segment conductors of the second series conductor group are classified into the third conductor group inserted into the first slot group and the fourth conductor group inserted into the second slot group.

* * * * *